United States Patent
Ishikawa et al.

(10) Patent No.: US 11,868,021 B2
(45) Date of Patent: Jan. 9, 2024

(54) METHOD FOR MANUFACTURING OPTICAL MODULATOR, TESTING METHOD, NON-TRANSITORY STORAGE MEDIUM, AND LIGHT TRANSMISSION APPARATUS

(71) Applicant: Sumitomo Electric Industries, Ltd., Osaka (JP)

(72) Inventors: Tsutomu Ishikawa, Osaka (JP); Naoya Kono, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 17/570,455

(22) Filed: Jan. 7, 2022

(65) Prior Publication Data

US 2022/0244613 A1 Aug. 4, 2022

(30) Foreign Application Priority Data

Jan. 28, 2021 (JP) .................. 2021-012461

(51) Int. Cl.
  *G02F 1/21* (2006.01)
  *G01M 11/00* (2006.01)
  *G02F 1/225* (2006.01)

(52) U.S. Cl.
  CPC ............. *G02F 1/212* (2021.01); *G01M 11/30* (2013.01); *G02F 1/2257* (2013.01)

(58) Field of Classification Search
  CPC ...... G02F 1/212; G02F 1/2257; G02F 1/0136; G02F 1/011; G01M 11/30; G01M 11/00; H04B 10/548
  See application file for complete search history.

(56) References Cited

U.S. PATENT DOCUMENTS

| | | | | |
|---|---|---|---|---|
| 6,603,891 B2 * | 8/2003 | Schumann | ......... | G01R 1/06788 356/477 |
| 7,317,847 B1 * | 1/2008 | Wang | .................... | G02B 6/024 385/127 |
| 7,728,979 B2 * | 6/2010 | Wang | .................. | G01N 21/553 356/445 |
| 7,774,052 B2 * | 8/2010 | Burton | ................. | A61B 5/4809 600/545 |
| 7,864,330 B2 * | 1/2011 | Kawanishi | ............ | G01J 1/0425 356/478 |
| 8,401,399 B2 * | 3/2013 | Barton | ................. | H04B 10/801 398/201 |

(Continued)

FOREIGN PATENT DOCUMENTS

JP  2014-164243 A  9/2014
JP  2016-111398 A  6/2016

*Primary Examiner* — Andrew Jordan
(74) *Attorney, Agent, or Firm* — Volpe Koenig

(57) ABSTRACT

A method for manufacturing an optical modulator is disclosed. The method includes a step of preparing a Mach-Zehnder modulator, a step of acquiring, based on a light transmittance in an arm waveguide, a relationship between a voltage applied to an electrode and a phase change amount of light propagating through the arm waveguide, a step of acquiring, based on the relationship, a voltage in which the phase change amount of the light propagating through the arm waveguide has a predetermined when the light is modulated, and a step of storing the voltage in a storage unit.

10 Claims, 17 Drawing Sheets

(56) References Cited

U.S. PATENT DOCUMENTS

| | | | |
|---|---|---|---|
| 8,483,524 B2* | 7/2013 | Li | G02F 1/065 385/14 |
| 8,543,010 B2* | 9/2013 | Zhou | H04B 10/50575 398/198 |
| 8,718,486 B2* | 5/2014 | Barton | G02B 6/125 398/201 |
| 8,903,239 B2* | 12/2014 | Nishimoto | H04B 10/50575 398/79 |
| 8,934,741 B2* | 1/2015 | Chen | G02F 1/3615 385/14 |
| 8,953,950 B2* | 2/2015 | Nazarathy | G02F 7/00 398/213 |
| 9,069,224 B2* | 6/2015 | Nishimoto | G02F 1/2257 |
| 9,197,328 B2* | 11/2015 | Yamanaka | H04B 10/548 |
| 9,244,328 B2* | 1/2016 | Nishimoto | H04B 10/50575 |
| 9,270,380 B2* | 2/2016 | Barton | G02F 1/2255 |
| 9,411,140 B2* | 8/2016 | Debarre | G02B 27/0068 |
| 9,448,120 B2* | 9/2016 | Huang | G01M 11/0257 |
| 9,703,128 B2* | 7/2017 | Chen | G02F 1/065 |
| 9,791,723 B2* | 10/2017 | Banaei | G02F 1/065 |
| 9,887,780 B2* | 2/2018 | Barton | H04B 10/505 |
| 10,180,617 B1* | 1/2019 | Takei | G02F 1/225 |
| 10,509,295 B2* | 12/2019 | Padmaraju | G02F 1/225 |
| 10,890,822 B2* | 1/2021 | Kawaai | G02F 1/225 |
| 11,073,465 B2* | 7/2021 | Bahl | G01N 15/1459 |
| 11,086,187 B2* | 8/2021 | Padmaraju | G02F 1/225 |
| 11,561,449 B2* | 1/2023 | Holroyd | G02F 1/212 |
| 2002/0018609 A1* | 2/2002 | Schumann | G01R 1/06788 385/12 |
| 2004/0193068 A1* | 9/2004 | Burton | A61B 5/4812 600/595 |
| 2008/0285033 A1* | 11/2008 | Wang | G01N 21/553 356/364 |
| 2009/0290148 A1* | 11/2009 | Kawanishi | G01J 1/04 356/217 |
| 2010/0040322 A1* | 2/2010 | Li | G02B 6/1221 438/27 |
| 2010/0076333 A9* | 3/2010 | Burton | A61B 5/369 600/595 |
| 2010/0303469 A1* | 12/2010 | Barton | H04B 10/6151 29/428 |
| 2011/0118619 A1* | 5/2011 | Burton | A61B 5/411 600/544 |
| 2011/0125046 A1* | 5/2011 | Burton | A61B 5/16 600/544 |
| 2011/0206384 A1* | 8/2011 | Zhou | H04B 10/572 398/192 |
| 2012/0155880 A1* | 6/2012 | Nishimoto | G02F 1/2257 398/79 |
| 2012/0163749 A1* | 6/2012 | Huang | G02B 6/12004 385/2 |
| 2012/0170088 A1* | 7/2012 | Opris | G03H 1/2294 359/9 |
| 2012/0213531 A1* | 8/2012 | Nazarathy | G02F 7/00 398/202 |
| 2013/0051723 A1* | 2/2013 | Sudo | H04B 10/50575 385/3 |
| 2013/0148982 A1* | 6/2013 | Barton | H04B 10/516 398/185 |
| 2013/0278744 A1* | 10/2013 | Debarre | G02B 21/06 348/79 |
| 2014/0241659 A1 | 8/2014 | Fukuda et al. | |
| 2014/0356001 A1* | 12/2014 | Barton | H04B 10/505 398/183 |
| 2015/0071582 A1* | 3/2015 | Nishimoto | H04B 10/50572 385/3 |
| 2015/0071583 A1* | 3/2015 | Nishimoto | G02F 1/2257 385/3 |
| 2015/0093120 A1* | 4/2015 | Sakai | H04B 10/5057 398/188 |
| 2015/0146196 A1* | 5/2015 | Huang | G01M 11/0257 356/121 |
| 2016/0018674 A1* | 1/2016 | Banaei | G02F 1/065 385/2 |
| 2016/0036532 A1* | 2/2016 | Noguchi | H04B 10/50572 398/38 |
| 2016/0156418 A1 | 6/2016 | Yamanaka et al. | |
| 2016/0344480 A1* | 11/2016 | Barton | G02B 6/125 |
| 2016/0349547 A1* | 12/2016 | Chen | G02B 6/12004 |
| 2018/0267384 A1* | 9/2018 | Padmaraju | G02F 1/225 |
| 2019/0056303 A1* | 2/2019 | Bahl | G01N 15/1404 |
| 2020/0081313 A1* | 3/2020 | Padmaraju | G02F 1/0123 |
| 2020/0089075 A1* | 3/2020 | Kawaai | G02F 1/225 |
| 2022/0146900 A1* | 5/2022 | Holroyd | G02F 1/225 |
| 2022/0200244 A1* | 6/2022 | Zilkie | G02B 6/29329 |
| 2022/0236620 A1* | 7/2022 | Ishikawa | G02F 1/2257 |
| 2022/0244613 A1* | 8/2022 | Ishikawa | G02F 1/2257 |

* cited by examiner

METHOD FOR MANUFACTURING OPTICAL MODULATOR, TESTING METHOD, NON-TRANSITORY STORAGE MEDIUM, AND LIGHT TRANSMISSION APPARATUS

CROSS REFERENCE TO RELATED APPLICATIONS

This application claims priority based on Japanese Patent Application No. 2021-012461 filed on Jan. 28, 2021, and the entire contents of the Japanese patent application are incorporated herein by reference.

TECHNICAL FIELD

The present disclosure relates to a method for manufacturing an optical modulator, a testing method, a non-transitory storage medium, and a light transmission apparatus.

BACKGROUND ART

A Mach-Zehnder modulator formed of a semiconductor layer and modulating light has been developed (Patent Document 1).
[Patent Document 1] Japanese Unexamined Patent Application Publication No. 2014-164243

SUMMARY OF THE INVENTION

A method according to the present disclosure is a method for manufacturing optical modulator. The optical modulator includes a Mach-Zehnder modulator. The Mach-Zehnder modulator including an electrode and an arm waveguide. The electrode is disposed on the arm waveguide. The method includes a step of preparing the Mach-Zehnder modulator, a step of acquiring, based on a light transmittance in the arm waveguide, a relationship between a voltage applied to the electrode and a phase change amount of light propagating through the arm waveguide, a step of acquiring, based on the relationship, a voltage in which the phase change amount of the light propagating through the arm waveguide has a predetermined amount when the light is modulated, and a step of storing the voltage acquired in the step of acquiring in a storage unit.

A testing method according to the present disclosure is a method for testing an optical modulator. The optical modulator includes a Mach-Zehnder modulator. The Mach-Zehnder modulator includes an electrode and an arm waveguide. The electrode is disposed on the arm waveguide. The method includes a step of acquiring, based on a light transmittance in the arm waveguide, a relationship between a voltage applied to the electrode and a phase change amount of light propagating through the arm waveguide, and a step of acquiring, based on the relationship, a voltage in which the phase change amount of the light propagating through the arm waveguide has a predetermined amount when the light is modulated.

A non-transitory storage medium according to the present disclosure is a program for testing an optical modulator. The optical modulator includes a Mach-Zehnder modulator. The Mach-Zehnder modulator including an electrode and an arm waveguide. The electrode is disposed on the arm waveguide. The program causes a computer to execute a process of acquiring, based on a light transmittance in the arm waveguide, a relationship between a voltage applied to the electrode and a phase change amount of light propagating through the arm waveguide, and a process of acquiring, based on the relationship, a voltage in which the phase change amount of the light propagating through the arm waveguide has a predetermined amount when the light is modulated.

A light transmission apparatus according to the present disclosure includes a storage unit and a plurality of Mach-Zehnder modulators. The plurality of Mach-Zehnder modulators each include an electrode and an arm waveguide, the electrode is disposed on the arm waveguide, and the storage unit stores, for each of the plurality of Mach-Zehnder modulators, a voltage in which a phase change amount of light propagating through the arm waveguide has a predetermined amount when the light is modulated.

DETAILED DESCRIPTION OF THE INVENTION

Figure 1A:
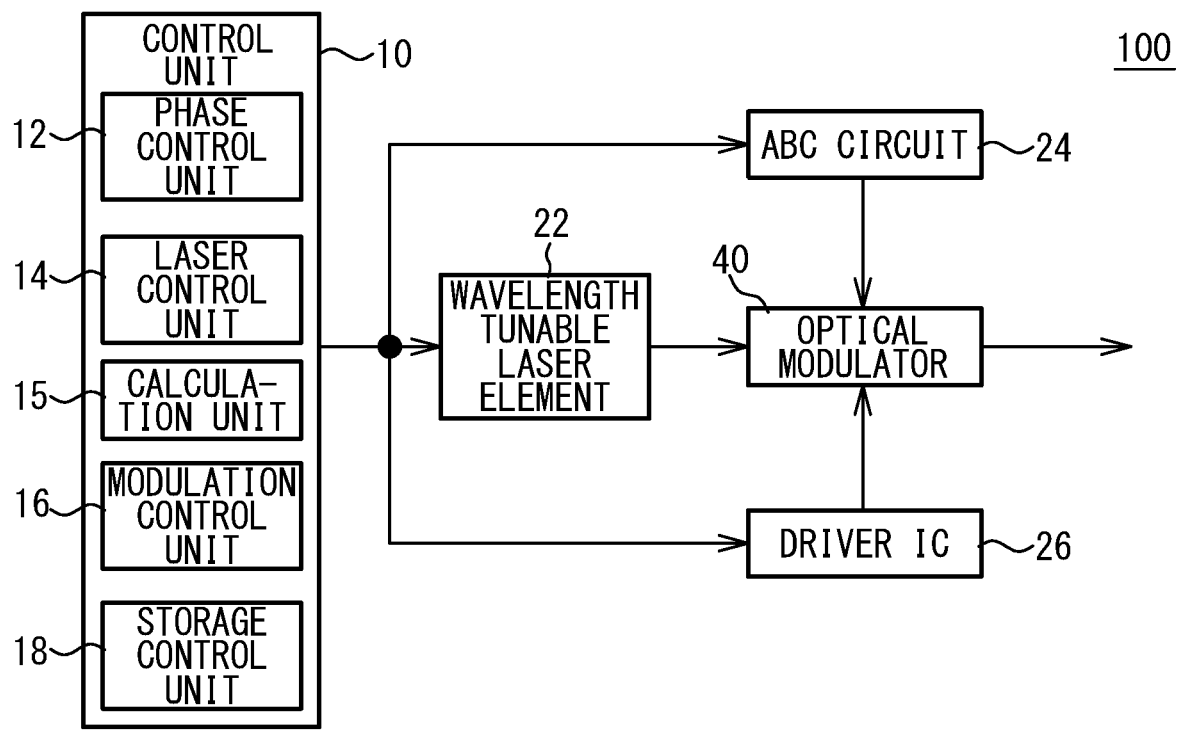
FIG. 1A is a block diagram illustrating a light transmission apparatus according to a first embodiment.

Light propagates through an arm waveguide of the Mach-Zehnder optical modulator. The phase of light can be adjusted by applying a voltage to the Mach-Zehnder optical modulator. At the time of modulation, for example, in order to increase the intensity of the output light, a phase change amount is set to a predetermined magnitude.

The magnitude of the phase change amount with respect to the voltage (phase adjusting efficiency) varies from Mach-Zehnder modulator to Mach-Zehnder modulator. When the same voltage is applied to a plurality of Mach-Zehnder modulators, the phase change amount in one Mach-Zehnder modulator is large and the phase change amount in another Mach-Zehnder modulator is small. Even in the Mach-Zehnder modulator having a small phase adjusting efficiency, the voltage may be increased in order to set the phase change amount to a predetermined magnitude. However, there is a positive correlation between the phase adjusting efficiency and the absorption loss of light. Increasing the voltage also increases the absorption loss of light. Therefore, it is an object of the present disclosure to provide a method for manufacturing optical modulator, a testing method, a non-transitory storage medium, and light transmission apparatus capable of suppressing an increase in light absorption loss.

First, contents of embodiments of the present disclosure will be listed and described.

According to an aspect of the present disclosure, (1) there is provided a method for manufacturing an optical modulator. The Mach-Zehnder modulator including an electrode and an arm waveguide. The electrode is disposed on the arm waveguide. The method includes a step of preparing the Mach-Zehnder modulator, a step of acquiring, based on a light transmittance in the arm waveguide, a relationship between a voltage applied to the electrode and a phase change amount of light propagating through the arm waveguide, a step of acquiring, based on the relationship, a voltage in which the phase change amount of the light propagating through the arm waveguide has a predetermined amount when the light is modulated, and a step of storing the acquired voltage in a storage unit. By applying the acquired voltage to the Mach-Zehnder optical modulator to modulate the light, the change amount of the phase at the time of modulation can be set to a predetermined magnitude, and an increase in the absorption loss of the light can be suppressed.

(2) The step of preparing the Mach-Zehnder optical modulator may be a step of preparing a plurality of the Mach-Zehnder modulators, and the step of acquiring the relationship between the voltage and the phase change amount and the step of acquiring the voltage may be performed on each of the plurality of Mach-Zehnder modulators. The change amount of the phase at the time of modulation can be set to the predetermined magnitude for each Mach-Zehnder optical modulator, and the increase in the absorption loss of light is suppressed.

(3) The step of preparing the Mach-Zehnder optical modulator may include a step of preparing the Mach-Zehnder modulator including a first arm waveguide, a second arm waveguide, a first electrode, and a second electrode. The first electrode is disposed on the first arm waveguide. The second electrode is disposed on the second arm waveguide. The step of acquiring the voltage may include a step of acquiring a voltage that is applied to the first electrode and in which a phase change amount of light propagating through the first arm waveguide has a predetermined amount, and a step of acquiring a voltage that is applied to the second electrode and in which a phase change amount of light propagating through the second arm waveguide has a predetermined amount. At the time of modulation, the change amount of the phase in the first arm waveguide and the change amount of the phase in the second arm waveguide can be set to the predetermined magnitude. The increase in light absorption loss can also be suppressed.

(4) In the method for manufacturing an optical modulator, the voltage applied to the first electrode may be a sum of first voltage and a second voltage. The voltage applied to the second electrode may be a difference between the first voltage and the second voltage. The step of the voltage may include a step of acquiring the first voltage in which the second voltage has a predetermined value or less. At the time of modulation, the phase change amount of the phase in the first arm waveguide and the phase change amount of the phase in the second arm waveguide can be set to the predetermined magnitude. By setting the second voltage to the predetermined value or less, an increase in power consumption can be suppressed.

(5) The step of preparing the Mach-Zehnder optical modulator may include a step of preparing the Mach-Zehnder optical modulator including the first arm waveguide, the second arm waveguide, the first electrode, the second electrode, a third electrode and a fourth electrode. The third electrode may be disposed on the first arm waveguide, and the fourth electrode may be disposed on the second arm waveguide. The step of acquiring the relationship between the voltage and the phase change amount may include a step of acquiring a relationship between the voltage applied to the first electrode and the phase change amount of the light propagating through the first arm waveguide, based on a relationship between a voltage applied to the third electrode and the phase change amount of the light propagating through the first arm waveguide, and a step of acquiring a relationship between the voltage applied to the second electrode and the phase change amount of the light propagating through the second arm waveguide, based on a relationship between a voltage applied to the fourth electrode and the phase change amount of the light propagating through the second arm waveguide. A highly accurate relationship between the voltage and the phase change amount is obtained. The phase change amount can be set to the predetermined magnitude and the increase in absorption loss of light is suppressed.

(6) The method for manufacturing an optical modulator may further include a step of measuring a first transmittance which is a light transmittance in the arm waveguide, and a step of calculating a second transmittance which is a light transmittance in the arm waveguide. In the step of calculating the second transmittance, a second transmittance in the first arm waveguide is represented by a function of the phase change amount of the light propagating through the first arm waveguide, the phase change amount of the light propagating through the first arm waveguide is represented by a function of the voltage applied to the third electrode, and thus the second transmittance in the first arm waveguide is calculated, and a second transmittance in the second arm waveguide is represented by a function of the phase change amount of the light propagating through the second arm waveguide, the phase change amount of the light propagating through the second arm waveguide is represented by a function of the voltage applied to the fourth electrode, and thus the second transmittance in the second arm waveguide is calculated. The step of acquiring the relationship between the voltage and the phase change amount may include a step of acquiring a relationship between the voltage applied to the third electrode and the phase change amount of the light propagating through the first arm waveguide by adjusting the second transmittance in the first arm waveguide such that the second transmittance in the first arm waveguide approaches a first transmittance in the first arm waveguide, and a step of acquiring a relationship between the voltage applied to the fourth electrode and the phase change amount of the light propagating through the second arm waveguide by adjusting the second transmittance in the second arm waveguide such that the second transmittance in the second arm waveguide approaches a first transmittance in the second arm waveguide. By bringing the second transmittance closer to the first transmittance, a highly accurate relationship between the voltage and the phase change amount can be obtained. The phase change amount can be set to the predetermined magnitude and the increase in absorption loss of light is suppressed.

(7) The step of preparing the Mach-Zehnder modulator may include a step of forming the Mach-Zehnder modulator. The step of forming the Mach-Zehnder modulator may include a step of forming the arm waveguide including a first semiconductor layer, a core layer, and a second semiconductor layer. The first semiconductor layer, the core layer, and the second semiconductor layer are stacked in order. The first semiconductor layer has a first conductivity type. The second semiconductor layer has a second conductivity type. Dopants are added to the first semiconductor layer and the second semiconductor layer. The phase adjusting efficiency of the Mach-Zehnder modulator varies due to the variation in the amount of thermal diffusion of the dopants. By applying the acquired voltage to the Mach-Zehnder modulator, it is possible to set the phase change amount to the predetermined magnitude and suppress the increase in light absorption loss.

(8) Another aspect of the present disclosure is a method for testing an optical modulator. The optical modulator includes a Mach-Zehnder modulator. The Mach-Zehnder modulator includes an electrode and an arm waveguide. The electrode is disposed on the arm waveguide. The method includes a step of acquiring, based on a light transmittance in the arm waveguide, a relationship between a voltage applied to the electrode and a phase change amount of light propagating through the arm waveguide, and a step of acquiring, based on the relationship, a voltage in which the phase change amount of the light propagating through the arm waveguide has a predetermined amount when the light is modulated. By applying the acquired voltage to the Mach-Zehnder optical modulator to modulate the light, the phase change amount at the time of modulation can be set to the predetermined magnitude, and the increase in the absorption loss of the light can be suppressed.

(9) Another aspect of the present disclosure is a non-transitory storage medium storing a program for testing an optical modulator. The optical modulator includes a Mach-Zehnder modulator. The Mach-Zehnder modulator including an electrode and an arm waveguide. The electrode is disposed on the arm waveguide. The program causes a computer to execute a process of acquiring, based on a light transmittance in the arm waveguide, a relationship between a voltage applied to the electrode and a phase change amount of light propagating through the arm waveguide, and a process of acquiring, based on the relationship, a voltage in which the phase change amount of the light propagating through the arm waveguide has a predetermined amount when the light is modulated. By applying the acquired voltage to the Mach-Zehnder modulator to modulate the light, the phase change amount at the time of modulation can be set to the predetermined magnitude, and the increase in the absorption loss of the light can be suppressed.

(10) Another aspect of the present disclosure is a light transmission apparatus. The light transmission apparatus according to the present disclosure includes a storage unit and a plurality of Mach-Zehnder modulators. The plurality of Mach-Zehnder modulators each include an electrode and an arm waveguide, the electrode is disposed on the arm waveguide, and the storage unit stores, for each of the plurality of Mach-Zehnder modulators, a voltage in which a phase change amount of light propagating through the arm waveguide has a predetermined amount when the light is modulated. By applying the stored voltage to the Mach-Zehnder modulator to modulate the light, the change amount of the phase at the time of modulation can be set to the predetermined magnitude, and the increase in the absorption loss of the light can be suppressed.

DETAILED DESCRIPTION OF EMBODIMENTS OF THE DISCLOSURE

Specific examples of a method for manufacturing optical modulator, a testing method, a non-transitory storage medium, and light transmission apparatus according to embodiments of the present disclosure will be described below with reference to the drawings. Note that the present disclosure is not limited to these examples, but is defined by the scope of the claims, and is intended to include all modifications within the meaning and scope equivalent to the scope of the claims.

First Embodiment (Light Transmission Apparatus)

FIG. 1A is a block diagram illustrating a light transmission apparatus 100 according to the first embodiment. As illustrated in FIG. 1A, light transmission apparatus 100 includes a control unit 10, a wavelength tunable laser element 22, an automatic bias control (ABC) circuit 24, a driver integrated circuit (IC) 26, and an optical modulator 40.

Wavelength tunable laser element 22 is a light emitting element including, for example, a semiconductor laser element. ABC circuit 24 applies a voltage for phase adjustment to optical modulator 40 to perform an automatic bias control. A driver IC 26 inputs a modulation signal to optical modulator 40. Optical modulator 40 modulates light incident from wavelength tunable laser element 22 and emits modulated light. Control unit 10 includes a computer such as a personal computer (PC).

Figure 1B:
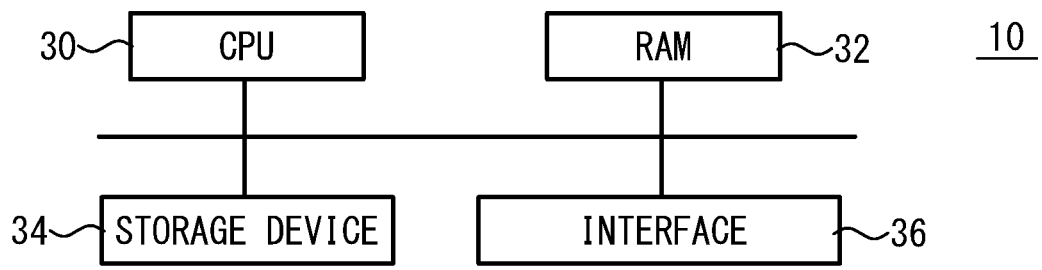
FIG. 1B is a block diagram illustrating a hardware configuration of a control unit.

FIG. 1B is a block diagram showing a hardware configuration of control unit 10. As illustrated in FIG. 1B, control unit 10 includes a CPU (Central Processing Unit) 30, a RAM (Random Access Memory) 32, a storage device 34 (storage unit), and an interface 36. CPU 30, RAM 32, storage device 34, and interface 36 are connected to each other via a bus or the like. RAM 32 is a volatile memory that temporarily stores programs, data, and the like. Storage device 34 is, for example, a read only memory (ROM), a solid state drive (SSD) such as a flash memory, or a hard disk drive (HHD). Storage device 34 stores a program for executing processing described later, a voltage obtained in the processing, and the like.

When CPU 30 executes the program stored in RAM 32, a phase control unit 12, a laser control unit 14, a calculation unit 15, a modulation control unit 16, and a storage control unit 18 illustrated in FIG. 1A are implemented in control unit 10. Phase control unit 12 controls ABC circuit 24 to adjust the voltage applied to optical modulator 40 by ABC circuit 24. Laser control unit 14 controls wavelength tunable laser element 22. Calculation unit 15 calculates a transmittance, a phase change amount, and the like as described later. Modulation control unit 16 controls driver IC 26. Storage control unit 18 controls RAM 32 and storage device 34 illustrated in FIG. 1B to store data therein. Each unit of control unit 10 may be hardware such as a circuit.

(Optical Modulator)

Figure 2A:
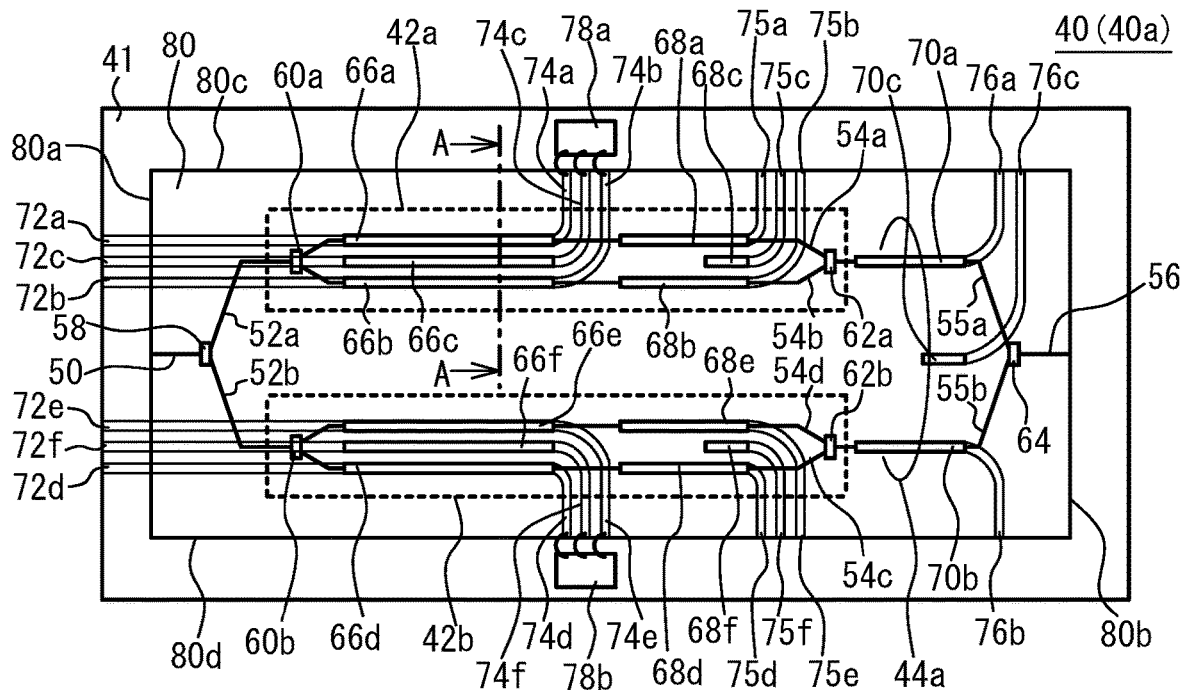
FIG. 2A is a plan view illustrating an optical modulator.

FIG. 2A is a plan view illustrating an optical modulator 40a. In the first embodiment, optical modulator 40a is used as optical modulator 40 illustrated in FIG. 1A. Optical modulator 40a is an In-phase Quadrature (IQ) modulator and includes a substrate 41, two sub Mach-Zehnder modulators 42a and 42b, and a main Mach-Zehnder modulator 44a. Substrate 41 is an insulating substrate made of, for example, ceramic. A module including optical modulator 40a may be formed by providing substrate 41 with ABC circuit 24 and driver IC 26 of FIG. 1A, and lenses and the like (not illustrated).

A semiconductor substrate 80 and two termination elements 78a and 78b are mounted on an upper surface of substrate 41. Each of termination elements 78a and 78b includes, for example, a termination resistor and a capacitor. Two sub Mach-Zehnder modulators 42a and 42b, main Mach-Zehnder modulator 44a, an input waveguide 50 and, an output waveguide 56 are formed on semiconductor substrate 80. Semiconductor substrate 80 has four end surfaces 80a, 80b, 80c and 80d. End surface 80a and end surface 80b face each other. End surface 80c and end surface 80d face each other.

A first end portion of input waveguide 50 is located on end surface 80a of the four end surfaces of semiconductor substrate 80. A second end portion of input waveguide 50 is connected to a coupler 58. A first end portion of output waveguide 56 is connected to a coupler 64. A second end portion of output waveguide 56 is located on end surface 80b of the four end surfaces of semiconductor substrate 80. Coupler 58 is a one input two output (1×2) multimode interference (MMI) coupler. Coupler 64 is a two input one output (2×1) MMI coupler. Two sub Mach-Zehnder modulators 42a and 42b are arranged in parallel between coupler 58 and coupler 64. Main Mach-Zehnder modulator 44a is arranged between two sub Mach-Zehnder modulators 42a and 42b and coupler 64.

(Sub Mach-Zehnder Modulator)

Sub Mach-Zehnder modulator 42a is, for example, a modulator for an In-phase channel (Ich). Sub Mach-Zehnder modulator 42b is, for example, a modulator for a Quadrature channel (Qch). Sub Mach-Zehnder modulator 42a includes arm waveguides 52a, 54a and 54b, modulation electrodes 66a and 66b, phase adjusting electrodes 68a and 68b, and ground electrodes 66c and 68c. Arm waveguide 54a is, for example, a p-side waveguide. Arm waveguide 54b is, for example, an n-side waveguide.

A first end portion of arm waveguide 52a is connected to a first output end of two output ends of coupler 58. A second end portion of arm waveguide 52a is connected to an input end of a coupler 60a. A first end portion of arm waveguide 54a (first arm waveguide) is connected to a first output end of two output ends of coupler 60a. A second end portion of arm waveguide 54a is connected to a first input end of two input ends of a coupler 62a. A first end portion of arm waveguide 54b (second arm waveguide) is connected to a second output end of the two output ends of coupler 60a. A second end portion of arm waveguide 54b is connected to a second input end of the two input ends of coupler 62a.

Arm waveguide 52a bends in the vicinity of coupler 58. Arm waveguides 54a and 54b bend in the vicinity of coupler 60a and bend in the vicinity of coupler 62a. Except for these bent portions, arm waveguides 52a, 54a and 54b are parallel to each other and parallel to end surface 80c of semiconductor substrate 80.

Modulation electrode 66a (first electrode) and phase adjusting electrode 68a (third electrode) are provided on arm waveguide 54a. Modulation electrode 66a and phase adjusting electrode 68a are separated from each other, and are arranged in order from coupler 60a toward coupler 62a. Modulation electrode 66b (second electrode) and phase adjusting electrode 68b (fourth electrode) are provided on arm waveguide 54b. Modulation electrode 66b and phase adjusting electrode 68b are separated from each other, and are arranged in order from coupler 60a toward coupler 62a.

Modulation electrode 66a and modulation electrode 66b face each other in a direction intersecting the extending direction of arm waveguides 54a and 54b. Ground electrode 66c is located between modulation electrode 66a and modulation electrode 66b. Phase adjusting electrode 68a and phase adjusting electrode 68b face each other. Ground electrode 68c is located between phase adjusting electrode 68a and phase adjusting electrode 68b. Modulation electrodes 66a and 66b, phase adjusting electrodes 68a and 68b, and ground electrodes 66c and 68c extend in the same direction as arm waveguides 54a and 54b, and are parallel to end surface 80c of semiconductor substrate 80.

Wiring lines 72a and 74a are electrically connected to modulation electrode 66a. Wiring line 72a extends from a first end portion of modulation electrode 66a to end surface 80a of semiconductor substrate 80. Wiring line 74a extends from a second end portion of modulation electrode 66a to end surface 80c of semiconductor substrate 80. Wiring lines 72b and 74b are electrically connected to modulation electrode 66b. Wiring line 72b extends from a first end portion of modulation electrode 66b to end surface 80a. Wiring line 74b extends from a second end portion of modulation electrode 66b to end surface 80c. Wiring lines 72c and 74c are electrically connected to ground electrode 66c. Wiring line 72c extends from a first end portion of ground electrode 66c to end surface 80a. Wiring line 74c extends from a second end portion of ground electrode 66c to end surface 80c.

Modulation electrode 66a is electrically connected to driver IC 26 illustrated in FIG. 1A via wiring line 72a. Modulation electrode 66b is electrically connected to driver IC 26 via wiring line 72b. Ground electrode 66c is electrically connected to driver IC 26 via wiring line 72c. Wiring lines 74a, 74b and 74c are electrically connected to termination element 78a by bonding wires.

A wiring line 75a is electrically connected to phase adjusting electrode 68a. A wiring line 75b is electrically connected to phase adjusting electrode 68b. A wiring line 75c is electrically connected to ground electrode 68c. Wiring lines 75a, 75b and 75c extend to end surface 80c. Phase adjusting electrode 68a is electrically connected to ABC circuit 24 via wiring line 75a. Phase adjusting electrode 68b is electrically connected to ABC circuit 24 via wiring line 75b. Ground electrode 68c is electrically connected to ABC circuit 24 via wiring line 75c.

Sub Mach-Zehnder modulator 42b includes arm waveguides 52b, 54c and 54d, modulation electrodes 66d and 66e, phase adjusting electrodes 68d and 68e, and ground electrodes 66f and 68f. Arm waveguide 54c (first arm waveguide) is, for example, a p-side waveguide. Arm waveguide 54d (second arm waveguide) is, for example, an n-side waveguide.

A first end portion of arm waveguide 52b is connected to the second output end of coupler 58. A second end portion of arm waveguide 52b is connected to the input end of a coupler 60b. Arm waveguides 54c and 54d are connected to coupler 60b and a coupler 62b. The lengths of arm waveguides of sub Mach-Zehnder modulator 42b are equal to the lengths of the corresponding arm waveguides of sub Mach-Zehnder modulator 42a. The shapes of arm waveguides of sub Mach-Zehnder modulator 42b are the same as the shapes of the corresponding arm waveguides of sub Mach-Zehnder modulator 42a.

A modulation electrode 66d (first electrode) and phase adjusting electrode 68d (third electrode) are provided on arm waveguide 54c. A modulation electrode 66e (second electrode) and phase adjusting electrode 68e (fourth electrode) are provided on arm waveguide 54d. Ground electrode 66f is provided between modulation electrode 66d and modulation electrode 66e. Ground electrode 68f is provided between phase adjusting electrode 68d and phase adjusting electrode 68e.

Wiring lines 72d and 74d are electrically connected to modulation electrode 66d. Wiring lines 72e and 74e are electrically connected to modulation electrode 66e. Wiring lines 72f and 74f are electrically connected to ground electrode 66f. Wiring lines 72d, 72e and 72f extend to end surface 80a of semiconductor substrate 80. Modulation electrode 66d is electrically connected to driver IC 26 via wiring line 72d. Modulation electrode 66e is electrically connected to driver IC 26 via wiring line 72e. Ground electrode 66f is electrically connected to driver IC 26 via wiring line 72f. Wiring lines 74d, 74e and 74f extend to end surface 80d of semiconductor substrate 80 and are electrically connected to termination element 78b.

A wiring line 75d is electrically connected to phase adjusting electrode 68d. A wiring line 75e is electrically connected to phase adjusting electrode 68e. A wiring line 75f is electrically connected to ground electrode 68f. Wiring lines 75d, 75e and 75f extend to end surface 80d. Phase adjusting electrode 68d is electrically connected to ABC circuit 24 via wiring line 75d. Phase adjusting electrode 68e is electrically connected to ABC circuit 24 via wiring line 75e. Ground electrode 68f is electrically connected to ABC circuit 24 via wiring line 75f.

The lengths of phase adjusting electrodes 68a, 68b, 68d and 68e are equal to each other. The lengths of modulation electrodes 66a, 66b, 66d and 66e and the lengths of ground electrodes 66c and 66f are equal to each other. The length of each modulation electrode is larger than the length of each phase adjusting electrode, and, for example, 2.5 times the length of phase adjusting electrode. The lengths of ground electrodes 68c and 68f are equal to each other and smaller than the lengths of phase adjusting electrodes.

(Main Mach-Zehnder Modulator)

Main Mach-Zehnder modulator 44a has arm waveguides 55a and 55b, phase adjusting electrodes 70a and 70b, and a ground electrode 70c. A first end portion of arm waveguide 55a is connected to an output end of coupler 62a. A first end portion of arm waveguide 55b is connected to an output end of coupler 62b. A second end portion of each of arm waveguides 55a and 55b is connected to an input end of coupler 64. Portions of arm waveguide 55a and 55b near sub Mach-Zehnder modulator are parallel to end surface 80c of semiconductor substrate 80, and portions of arm waveguides 55a and 55b near coupler 64 are bent.

A phase adjusting electrode 70a is provided on arm waveguide 55a. A phase adjusting electrode 70b is provided on arm waveguide 55b. Ground electrode 70c is provided between arm waveguide 55a and arm waveguide 55b. Phase adjusting electrodes 70a and 70b and ground electrode 70c extend in the same direction as the arm waveguides and are parallel to end surface 80c.

A wiring line 76a is electrically connected to an end portion of phase adjusting electrode 70a and extends to end surface 80c. A wiring line 76b is electrically connected to an end portion of phase adjusting electrode 70b and extends to end surface 80d. A wiring line 76c is electrically connected to an end portion of ground electrode 70c and extends to end surface 80c. Phase adjusting electrode 70a is electrically connected to ABC circuit 24 via wiring line 76a. Phase adjusting electrode 70b is electrically connected to ABC circuit 24 via wiring line 76b. Ground electrode 70c is electrically connected to ABC circuit 24 via wiring line 76c.

Figure 2B:
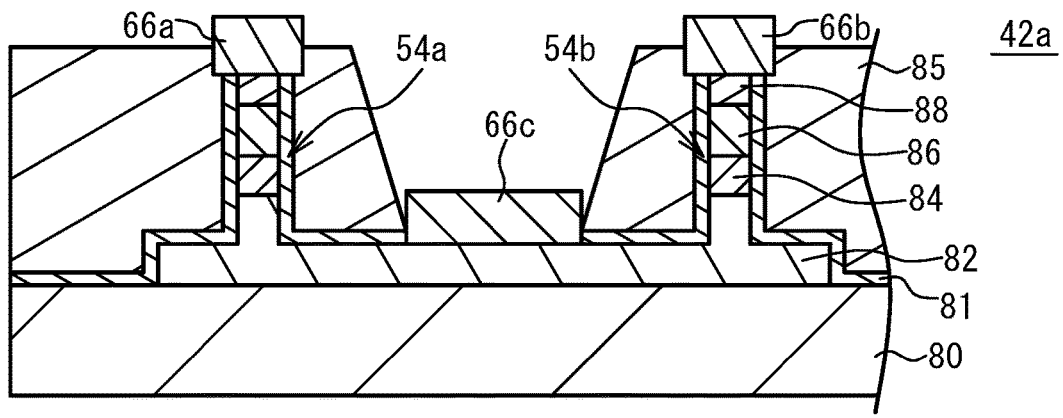
FIG. 2B is a cross-sectional view along line A-A of FIG. 2A.

FIG. 2B is a cross-sectional view taken along line A-A of FIG. 2A illustrating a cross section of sub Mach-Zehnder modulator 42a. Sub Mach-Zehnder modulator 42b and main Mach-Zehnder modulator 44a also have the same configuration as sub Mach-Zehnder modulator 42a.

As illustrated in FIG. 2B, a cladding layer 82 (first semiconductor layer) is provided on an upper surface of semiconductor substrate 80. Cladding layer 82 protrudes to the opposite side (upper side in the drawing) of semiconductor substrate 80 at two positions. A core layer 84, a cladding layer 86, and a contact layer 88 are sequentially stacked on the protruding portion. Cladding layer 82, core layer 84, cladding layer 86, and contact layer 88 form mesa-shaped arm waveguides 54a and 54b. Cladding layer 86 and contact layer 88 correspond to the second semiconductor layer.

Semiconductor substrate 80 is formed of, for example, semi-insulating indium phosphide (InP). Cladding layer 82 is formed of, for example, n-type InP (n-InP) having a thickness of 800 nm. Cladding layer 86 is formed of, for example, p-InP having a 1300 nm. Contact layer 88 is formed of, for example, p-InGaAs having a thickness of 200 nm. The n-type cladding layer 82 is doped with, for example, silicon (Si). The p-type cladding layer 86 and contact layer 88 are doped with, for example, zinc (Zn).

Core layer 84 has, for example, a multiple quantum well (MQW) structure. Core layer 84 includes a plurality of well layers and barrier layers alternately stacked. The well layer is formed of, for example, aluminum gallium indium arsenide (AlGaInAs). The barrier layer is formed of, for example, aluminum indium arsenide (AlinAs). Core layer 84 is, for example, a thickness of 500 nm.

The upper surface of semiconductor substrate 80, surfaces of cladding layer 82, and side surfaces and upper surfaces of arm waveguides 54a and 54b are covered with an insulating film 81. Insulating film 81 is formed of an insulator such as silicon oxide ($SiO_2$). A resin layer 85 is formed of, for example, benzocyclobutene (BCB) and covers a surface of insulating film 81. Insulating film 81 and resin layer 85 have openings in a portion of an upper surface of cladding layer 82 between arm waveguides 54a and 54b, and on arm waveguides 54a and 54b.

Modulation electrode 66a is provided on arm waveguide 54a. Modulation electrode 66b is provided on arm waveguide 54b. Modulation electrodes 66a and 66b are electrically connected to contact layer 88 exposed from the openings of insulating film 81 and resin layer 85. Ground electrode 66c is disposed on cladding layer 82 and electrically connected to cladding layer 82 exposed from insulating film 81 and resin layer 85. Phase adjusting electrodes 68a and 68b illustrated in FIG. 2A are also provided on an upper surface of contact layer 88. A ground electrode 68c is also provided on the upper surface of cladding layer 82.

Modulation electrode and phase adjusting electrode each have an ohmic electrode layer and wiring line layer. The ohmic electrode layer includes, for example, a platinum (Pt) layer, a titanium (Ti) layer, a platinum (Pt) layer, and a gold (Au) layer. These layers are laminated in order on contact layer 88. Wiring line layer is formed of, for example, Au or the like in contact with an upper surface of the ohmic electrode layer. Ground electrode has, for example, an alloy layer and an Au layer. The alloy layer is formed of, for example, an alloy of Au, germanium (Ge), and nickel (Ni). The Au layer is in contact with an upper surface of the alloy layer. Wiring line illustrated in FIG. 2A is provided on resin layer 85 illustrated in FIG. 2B and is made of a metal such as Au.

(Operation of Light Transmission Apparatus)

Next, the operation of light transmission apparatus 100 will be described. Laser control unit 14 of control unit 10 illustrated in FIG. 1A causes wavelength tunable laser element 22 to emit light. Light incident on input waveguide 50 of optical modulator 40*a* illustrated in FIG. 2A is branched at coupler 58 and propagates through arm waveguides 52*a* and 52*b*. The light propagating in arm waveguide 52*a* is branched in coupler 60*a* and propagates through arm waveguides 54*a* and 54*b*. The light propagating in arm waveguide 52*b* is branched in coupler 60*b* and propagates through arm waveguides 54*c* and 54*d*.

Modulation control unit 16 of control unit 10 illustrated in FIG. 1A generates a modulation signal based on transmission data and inputs the modulation signal to driver IC 26. Modulation signals are input from driver IC 26 to modulation electrodes 66*a* and 66*b* of sub Mach-Zehnder modulator 42*a*. Modulation signals are input from driver IC 26 to modulation electrodes 66*d* and 66*e* of sub Mach-Zehnder modulator 42*b*. The refractive indices of the arm waveguides change by inputting the modulation signals, thereby the lights are modulated.

The modulated light propagating in arm waveguide 54*a* and the modulated light propagating in arm waveguide 54*b* are multiplexed in coupler 62*a*. The modulated light after multiplexing propagates through arm waveguide 55*a* of main Mach-Zehnder modulator 44*a*. The modulated light propagating in arm waveguide 54*c* and the modulated light propagating in arm waveguide 54*d* are multiplexed in coupler 62*b*. The modulated light after multiplexing propagates through arm waveguide 55*b* of main Mach-Zehnder modulator 44*a*. The light propagating through arm waveguide 55*a* and the light propagating through arm waveguide 55*b* are multiplexed by coupler 64 and propagate through output waveguide 56. The modulated light is emitted from output waveguide 56 to the outside of optical modulator 40*a*.

Phase control unit 12 of control unit 10 performs automatic bias control using ABC circuit 24 to adjust the phase of light. When ABC circuit 24 applies a voltage to phase adjusting electrode, the refractive index of arm waveguide changes and the optical path length changes. The change of the optical path length changes the phase of light propagating through arm waveguide. Phase control unit 12 can independently control the phase of light in main Mach-Zehnder modulator 44*a* and the phase of light in each of sub Mach-Zehnder modulators 42*a* and 42*b*.

In a state where a modulation signal is not input to sub Mach-Zehnder modulator 42*a*, a phase shift between light propagating through arm waveguide 54*a* and light propagating through arm waveguide 54*b* is $\pi$ (rad) or $\pi \pm 2\pi \times n$ (n is a negative or positive integer). That is, sub Mach-Zehnder modulator 42*a* is adjusted to an extinction point. Sub Mach-Zehnder modulator 42*b* is also adjusted to the extinction point. The state adjusted to the extinction point is an operating point of sub Mach-Zehnder modulator.

The phase shift between the modulated light propagating in arm waveguide 55*a* of main Mach-Zehnder modulator 44*a* and the modulated light propagating in arm waveguide 55*b* of main Mach-Zehnder modulator 44*a* is 0.5 $\pi$ (rad) or a value equivalent to 0.5 $\pi$. Values equivalent to 0.5 $\pi$ are 0.5 $\pi \pm 2\pi \times n$ and 1.5 $\pi \pm 2\pi$ (n is a negative or positive integer). The modulated light propagating in arm waveguide 55*a* and the modulated light propagating in arm waveguide 55*b* are orthogonal to each other.

An example of a modulation method used in optical modulator 40*a* is a QPSK (Quadrature Phase Shift Keying) modulation method. In the QPSK modulation method, modulated lights corresponding to the four value symbol codes 00, 01, 10, and 11 of the modulated signal are generated. To generate modulated light, driver IC 26 applies voltages to the modulation electrodes.

A voltage applied to modulation electrode 66*a* is denoted by VIp, and a voltage applied to modulation electrode 66*b* is denoted by VIn. A voltage applied to modulation electrode 66*d* is denoted by VQp, and a voltage applied to modulation electrode 66*e* is denoted by VQn. Each of the voltages VIp, VIn, VQp, and VQn is calculated from a bias voltage Vb and an swing voltage Vpp.

Equation 1 indicates the voltages VIp, VIn, VQp, and VQn corresponding to symbol 00.

$$VIp = Vb + Vpp/2,\ VIn = Vb - Vpp/2,\ VQp = Vb + Vpp/2,\ VQn = Vb - Vpp/2 \quad \text{[Equation 1]}$$

Equation 2 indicates the voltages VIp, VIn, VQp, and VQn corresponding to the symbol code 01.

$$VIp = Vb - Vpp/2,\ VIn = Vb + Vpp/2,\ VQp = Vb + Vpp/2,\ VQn = Vb - Vpp/2 \quad \text{[Equation 2]}$$

Equation 3 indicates the voltages VIp, VIn, VQp and VQn corresponding to the symbol code 10.

$$VI = Vb - Vpp/2,\ VIn = Vb - Vpp/2,\ VQp = Vb - Vpp/2,\ VQn = Vb + Vpp/2 \quad \text{[Equation 3]}$$

Equation 4 indicates the voltages VIp, VIn, VQp, and VQn corresponding to the symbol code 11.

$$VIp = Vb - Vpp/2,\ VIn = Vb + Vpp/2,\ VQp = Vb - Vpp/2,\ VQn = Vb + Vpp/2 \quad \text{[Equation 4]}$$

FIG. 3 to FIG. 5B illustrate examples of constellation diagrams of the output lights. "Ip" in each figure is the output light from arm waveguide 42*a* on the p-side of sub Mach-Zehnder modulator 54*a* for Ich. "In" is the output light from arm waveguide 42*a* on the n-side of sub Mach-Zehnder modulator 54*b* for Ich. "Qp" is the output light from arm waveguide 42*b* on the p-side of sub Mach-Zehnder modulator 54*c* for Qch. "Qn" is the output light from arm waveguide 42*b* on the n-side of sub Mach-Zehnder modulator 54*d* for Qch.

Figure 3:
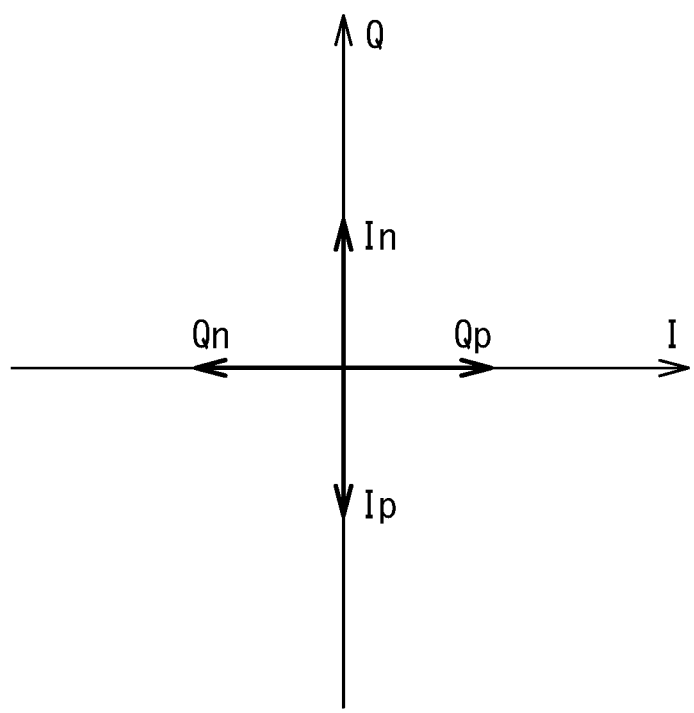
FIG. 3 is a constellation diagram of output light.

FIG. 3 is a constellation diagram in an unmodulated state. The swing voltage Vpp is 0 V. The bias voltage Vb is applied to each of the plurality of modulation electrodes. The sub Mach-Zehnder modulator is adjusted to the extinction point. The phase of the output light Ip from arm waveguide 54*a* on the p-side of sub Mach-Zehnder modulator 42*a* and the phase of the output light In from arm waveguide 54*b* on the n-side of sub Mach-Zehnder modulator 42*a* are opposite to each other. The output lights from the two arm waveguides cancel each other. The phase of the output light Qp from arm waveguide 54*c* of sub Mach-Zehnder modulator 42*b* and the phase of the output light Qn from arm waveguide 54*d* of sub Mach-Zehnder modulator 42b are opposite to each other. The output lights from the two arm waveguides cancel each other.

Figure 4A:
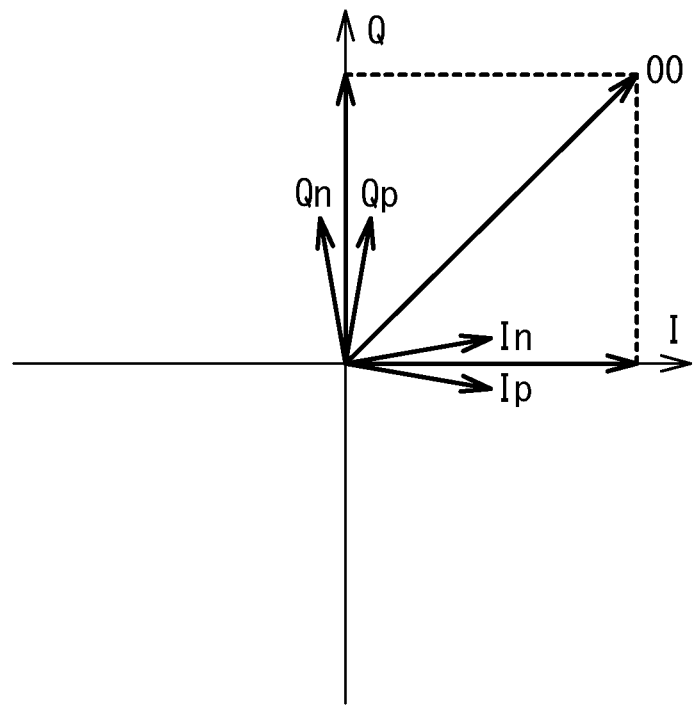
FIG. 4A is a constellation diagram of output light.

FIG. 4A is a constellation diagram of symbol code 00. The voltage expressed by Equation 1 is applied to each modulation electrode. The output light Ip from arm waveguide 54a is rotated by about π/2 counterclockwise compared to FIG. 3, by applying the voltage of Vpp/2 in Equation 1 to the electrode. The output light In from arm waveguide 54b is rotated by about π/2 clockwise compared to FIG. 3. by applying the voltage of −Vpp/2 to the electrode. The output light of sub Mach-Zehnder modulator 42a is obtained by multiplexing the output light Ip and the output light In, and is represented by a vector on the I-axis. The output light Qp from arm waveguide 54c rotates about π/2 counterclockwise compared to FIG. 3. The output light Qn from arm waveguide 54d rotates about π/2 clockwise compared to FIG. 3. The output light of sub Mach-Zehnder modulator 42b is obtained by multiplexing the output light Qp and the output light Qn, and is represented by a vector on the Q-axis. The output light of optical modulator 40a corresponding to the symbol code 00 is obtained by multiplexing the output light of sub Mach-Zehnder modulator 42a and the output light of sub Mach-Zehnder modulator 42b. The output light is represented by a vector located in a first quadrant.

Figure 4B:
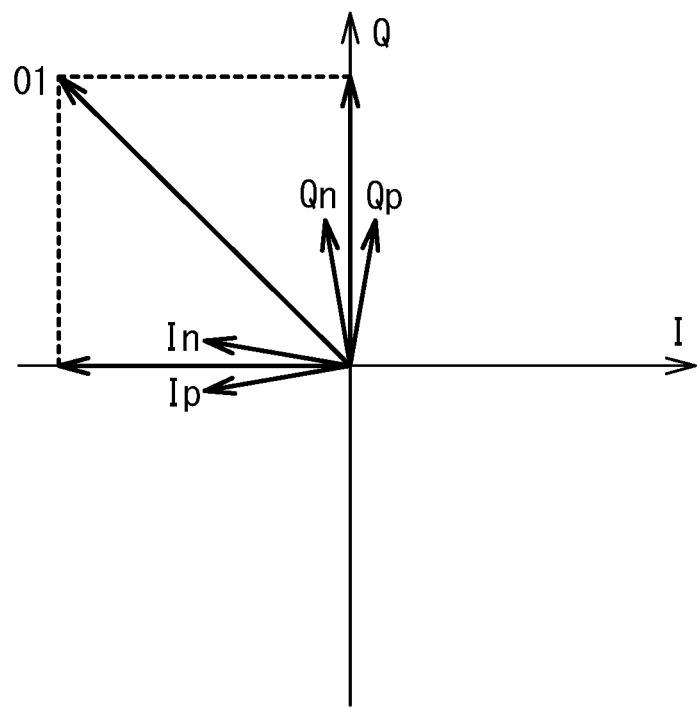
FIG. 4B is a constellation diagram of output light.

FIG. 4B is a constellation diagram of symbol code 01. The voltage expressed by Equation 2 is applied to each modulation electrode. The output light Ip from arm waveguide 54a rotates about π/2 clockwise compared to FIG. 3. The output light In from arm waveguide 54b rotates about π/2 counterclockwise compared to FIG. 3. The output light of sub Mach-Zehnder modulator 42a is represented by a vector on the I-axis. The output light Qp from arm waveguide 54c rotates about π/2 counterclockwise compared to FIG. 3. The output light Qn from arm waveguide 54d rotates about π/2 clockwise compared to FIG. 3. The output light of sub Mach-Zehnder modulator 42b is represented by a vector on the Q-axis. The output light of optical modulator 40a corresponding to the symbol code 01 is represented by a vector located in a second quadrant.

Figure 5A:
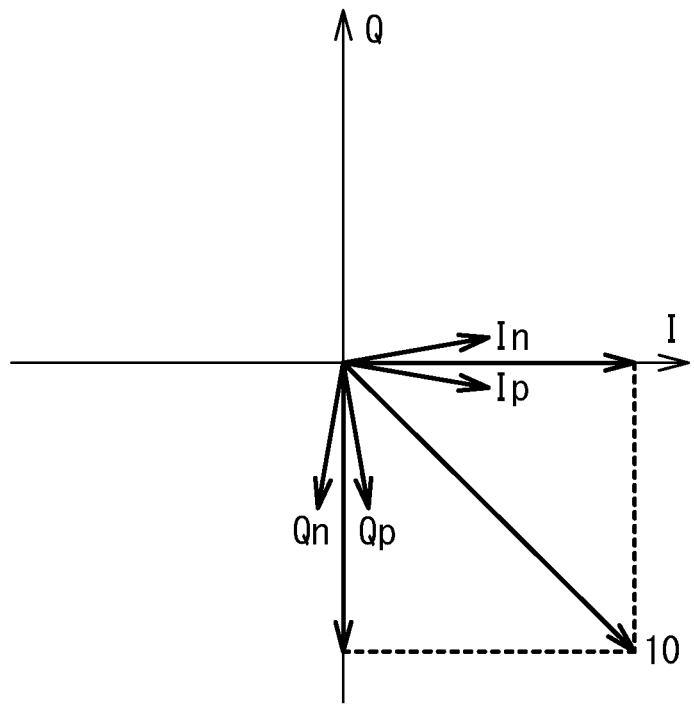
FIG. 5A is a constellation diagram of output light.

FIG. 5A is a constellation diagram of symbol code 10. The voltage expressed by Equation 3 is applied to each modulation electrode. The output light Ip from arm waveguide 54a rotates about π/2 counterclockwise compared to FIG. 3. The output light In from arm waveguide 54b rotates about π/2 clockwise compared to FIG. 3. The output light of sub Mach-Zehnder modulator 42a is represented by a vector on the I-axis. The output light Qp from arm waveguide 54c rotates about π/2 clockwise compared to FIG. 3. The output light Qn from arm waveguide 54d rotates about π/2 counterclockwise compared to FIG. 3. The output light of sub Mach-Zehnder modulator 42b is represented by a vector on the Q-axis. The output light of optical modulator 40a corresponding to the symbol code 10 is represented by a vector located in a fourth quadrant.

Figure 5B:
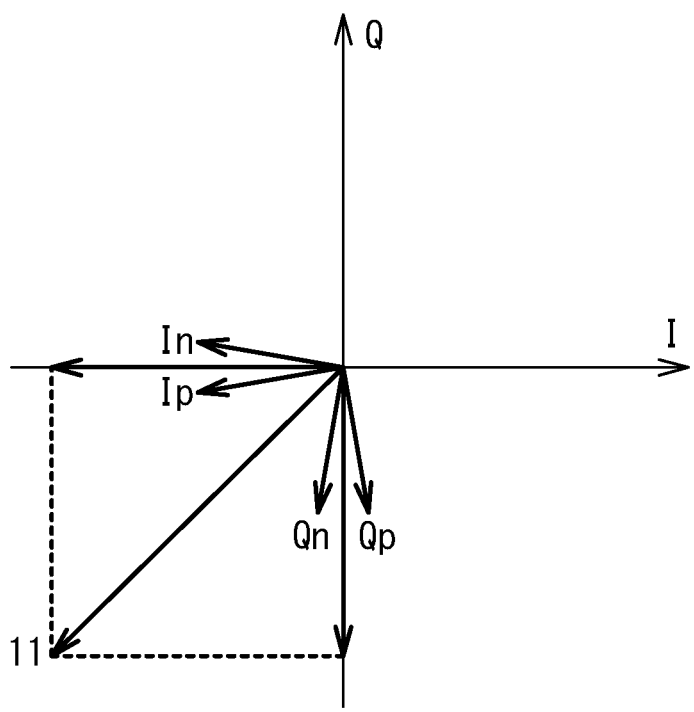
FIG. 5B is a constellation diagram of output light.

FIG. 5B is a constellation diagram of symbol code 11. The voltage expressed by Equation 4 is applied to each modulation electrode. The output light Ip from arm waveguide 54a rotates about π/2 clockwise compared to FIG. 3. The output light In from arm waveguide 54b rotates about π/2 counterclockwise compared to FIG. 3. The output light of sub Mach-Zehnder modulator 42a is represented by a vector on the I-axis. The output light Qp from arm waveguide 54c rotates about π/2 clockwise compared to FIG. 3. The output light Qn from arm waveguide 54d rotates about π/2 counterclockwise compared to FIG. 3. The output light of sub Mach-Zehnder modulator 42b is represented by a vector on the Q-axis. The output light of optical modulator 40a corresponding to the symbol code 11 is represented by a vector located in a third quadrant.

As illustrated in FIGS. 4A to 5B, the intensity of the modulated light is maximized by rotating the phase of the light in each arm waveguide about π/2 clockwise or counterclockwise compared to the unmodulated state. The swing voltage Vpp may be equal to a voltage Vπ that is defined as a voltage rotating the phase of a signal by π. The voltage π/2 that is half of the voltage Vπ is a voltage that rotates the phase by π/2. When Vpp is equals to Vπ, Vpp/2 becomes equal to Vπ/2. The voltages ±Vpp/2 in Equations 1, 2, 3 and 4 become equal to ±Vπ/2, and rotate the phases of the lights by ±π/2.

In order to suppress an increase in power consumption of driver IC 26, it is effective to reduce the swing voltage Vpp. An upper limit of the swing voltage Vpp is set to, for example, 1.7 V. On the other hand, as described in FIGS. 6A and 6B, by determining the bias voltage Vb, the swing voltage Vpp corresponding to the phase rotation of π/2 is also determined.

Figure 6A:
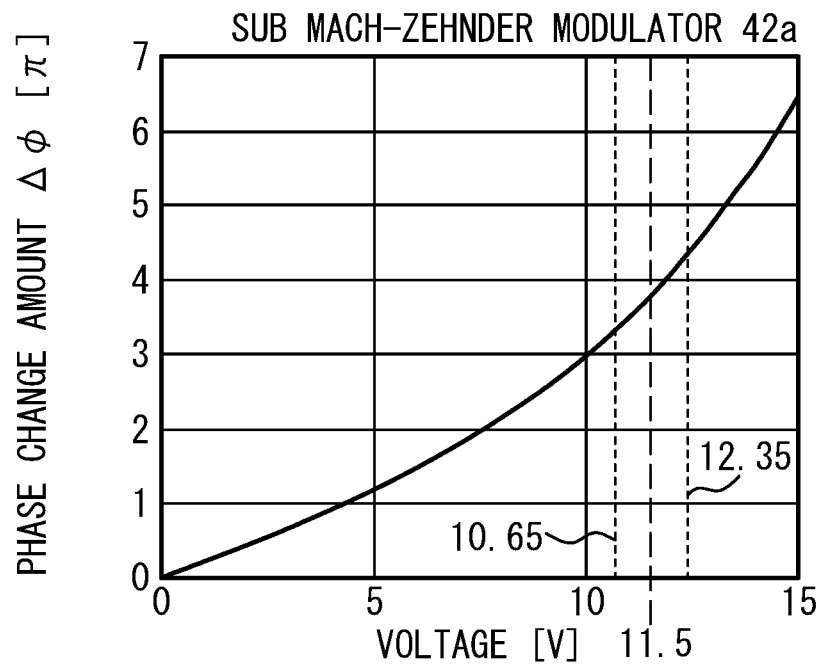
FIG. 6A is a diagram illustrating a relationship between voltage and a phase change amount.

FIG. 6A is a diagram illustrating a relationship between a voltage and a phase change amount. The horizontal axis represents the voltage applied to the modulation electrode of sub Mach-Zehnder modulator 42a. The vertical axis represents the phase change amount Δφ of the light in arm waveguides of sub Mach-Zehnder modulator 42a. As the voltage increases, the phase change amount Δφ also increases.

The dashed line in FIG. 6A indicates 11.5 V. In the case where the bias voltage Vb is 11.5 V, at the voltages indicated by the dotted lines, the phase change amount becomes ±π/2 with respect to the voltage of 11.5 V. That is, the difference in phase change amount between the two arm waveguides becomes π. More specifically, the voltage applied to modulation electrode 66a is set to Vb+Vpp/2=12.35 V. The output light from arm waveguide 54a is rotated by π/2. The voltage applied to modulation electrode 66b is set to Vb−Vpp/2=10.65 V. The output light from arm waveguide 54b is rotated by −π/2. Modulation as illustrated in FIG. 4A is possible. At this time, Vπ/2 is equal to Vpp/2=0.85 V. The swing voltage Vpp is 1.7 V, which is equal to the upper limit value.

As illustrated in FIG. 6A, the phase change amount Δφ has a nonlinear relationship with voltage. The greater the voltage, the greater the rate of change (slope) of the phase change amount Δφ. The slope of the phase change amount at the bias voltage Vb=11.5 V is larger than the slope of the phase change amount when the bias voltage Vb is less than 11.5 V. Therefore, Vπ/2 becomes small at the bias voltage Vb of 11.5 V. When the bias voltage Vb is less than 11.5 V, the slope of the phase change amount becomes small, and thus the swing voltage Vpp exceeds 1.7 V. In order to set the swing voltage Vpp to 1.7 V or less, the bias voltage Vb is set to 11.5 V or more.

Variation may occur in a rate of change of the phase with respect to the voltage (phase adjusting efficiency) for each Mach-Zehnder optical modulator. The difference in the phase adjusting efficiency is believed to be due to variations in amounts of thermal diffusion of dopants into cladding layers 82 and 86, contact layer 88. The difference in the amounts of thermal diffusion of the dopants causes a difference in the intensity of an electric field generated in core layer 84 when a voltage is applied. When there is a difference in the electric field, a difference in refractive index also occurs, and the phase change amount also has a different magnitude. Since the band gap energy also varies due to the variation in the thermal diffusion of the dopants, the phase change amount also changes. Here, it is assumed that the phase adjusting efficiency of sub Mach-Zehnder modulator 42a is higher than that of sub Mach-Zehnder modulator 42b.

Figure 6B:
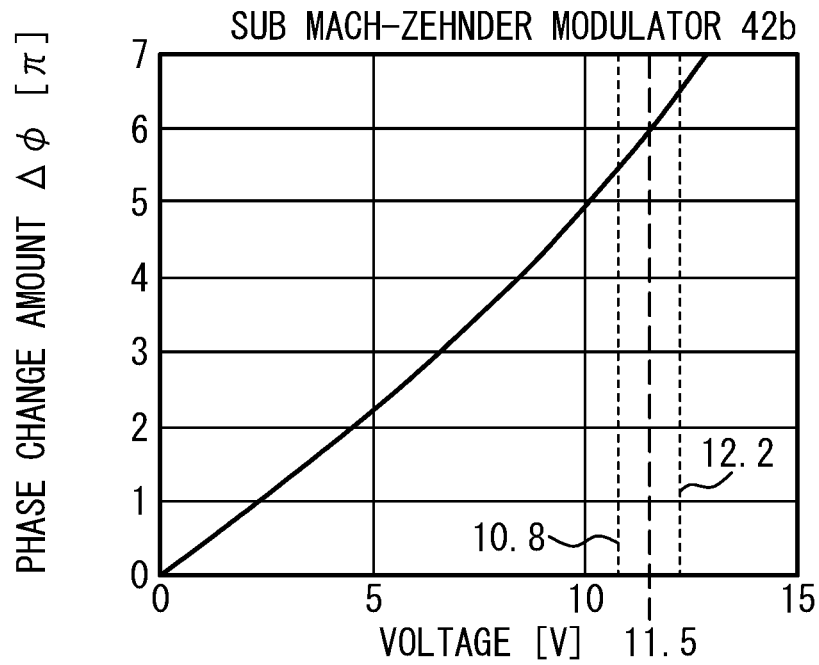
FIG. 6B is a diagram illustrating the relationship between voltage and a phase change amount.

FIG. 6B is a diagram illustrating a relationship between a voltage and a phase change amount. The horizontal axis represents the voltage applied to the modulation electrode of sub Mach-Zehnder modulator 42b. The vertical axis represents the phase change amount Δφ of the light in arm waveguides of sub Mach-Zehnder modulator 42b. Compared at the same voltage, the phase change amount Δφ in FIG. 6B is larger than that in FIG. 6A. Similar to sub Mach-Zehnder modulator 42a, when Vb is equal to 11.5 V, the voltage Vπ/2 corresponding to the phase rotation of π/2 becomes 0.7 V. The swing voltage Vpp of sub Mach-Zehnder modulator 42b becomes 1.4 V, which is smaller than that of sub Mach-Zehnder modulator 42a. As denoted by dashed lines in FIG. 6B, Vb+Vpp/2 is equal to 12.2V and Vb−Vpp/2 becomes equal to 10.8 V.

As illustrated in FIGS. 6A and 6B, by setting the bias voltage Vb to, for example, 11.5 V, the swing voltage Vpp can be set equal to or less than 1.7 V both in sub Mach-Zehnder modulators 42a having high phase adjusting efficiency and in sub Mach-Zehnder modulator 42b having low phase adjusting efficiency. By reducing the swing voltage Vpp, the power consumption of driver IC 26 can be reduced.

There is a positive correlation between the phase adjusting efficiency and the absorption loss of light in the arm waveguides. This is because Kramers-Kronig relationship is established between the change in the refractive index of the arm waveguide and the amount of light absorption. The smaller the phase adjusting efficiency, the smaller the absorption loss. The greater the phase adjusting efficiency, the greater the absorption loss.

Figure 7A:
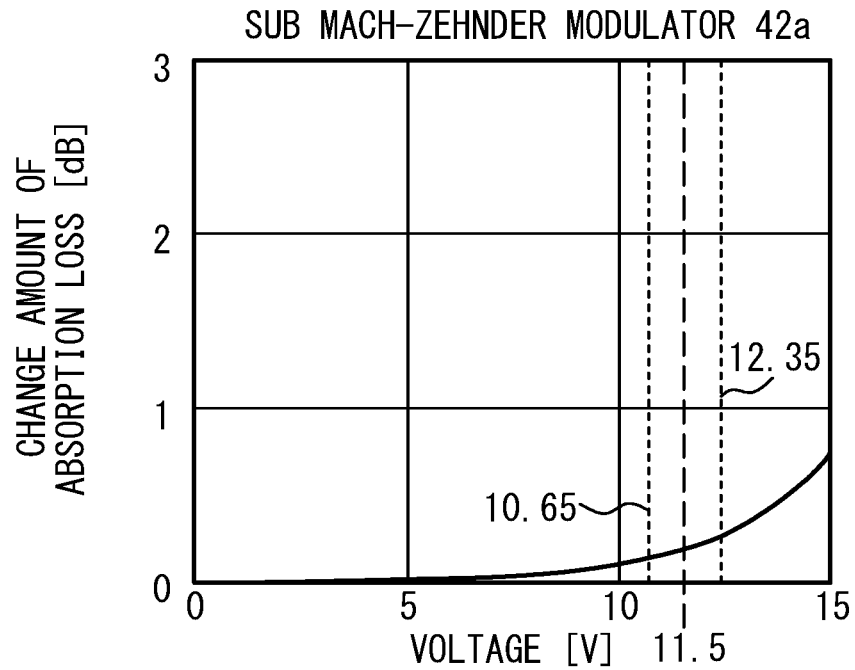
FIG. 7A is a diagram illustrating a relationship between voltage and a change amount of light absorption loss.
Figure 7B:
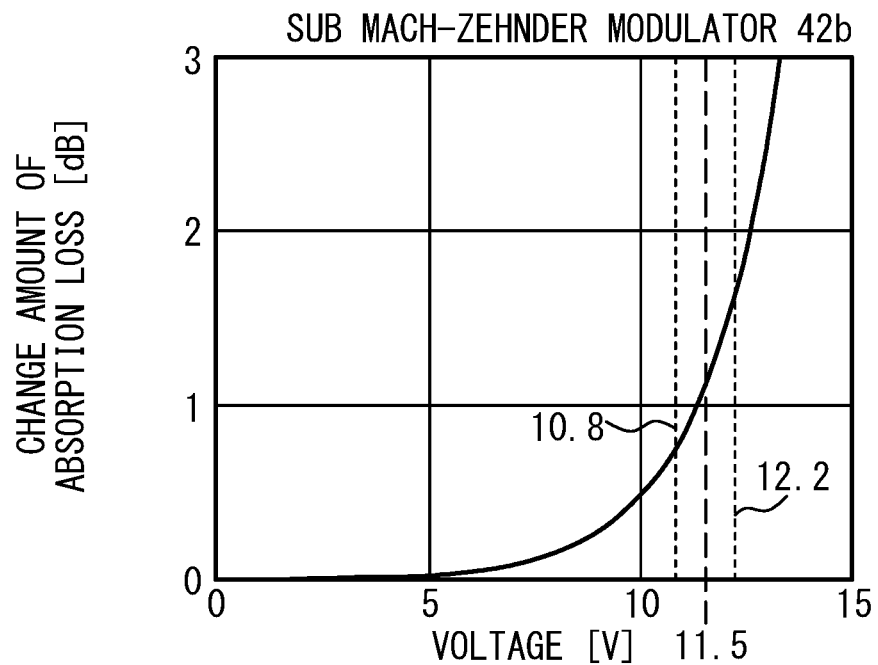
FIG. 7B is a diagram illustrating a relationship between voltage and a change amount of light absorption loss.

FIGS. 7A and 7B are diagrams each illustrating a relationship between a voltage and a change amount of absorption loss of light. The horizontal axis represents the voltage applied to the modulation electrode of the sub Mach-Zehnder modulator. The vertical axis represents the change amount of absorption loss of light in the arm waveguide.

FIG. 7A illustrates an example for sub Mach-Zehnder modulator 42a. FIG. 7B illustrates an example for sub Mach-Zehnder modulator 42b. The change amount of absorption loss in sub Mach-Zehnder modulator 42b is greater than the change amount of absorption loss in sub Mach-Zehnder modulator 42a. For example, at 11.5 V, the change amount of absorption loss of sub Mach-Zehnder modulator 42a is 0.18 dBand, the change amount of the absorption loss of sub Mach-Zehnder modulator 42b is 1.1 dB.

In order to reduce the power consumption of driver IC 26, the swing voltages Vpp are reduced in both sub Mach-Zehnder modulator 42b having a high phase adjusting efficiency and sub Mach-Zehnder modulator 42a having a low phase adjusting efficiency. As illustrated in FIGS. 6A and 6B, for both sub Mach-Zehnder modulators 42a and 42b, the bias voltage Vb may be set to, for example, 11.5 V. However, as illustrated in FIG. 7B, the change amount of absorption loss of sub Mach-Zehnder modulator 42b becomes larger than that of sub Mach-Zehnder modulator 42a. In order to suppress an increase in light absorption loss, it is important to optimize the voltage applied to the modulation electrode for each Mach-Zehnder optical modulator.

(Manufacturing Method)

Figure 8:
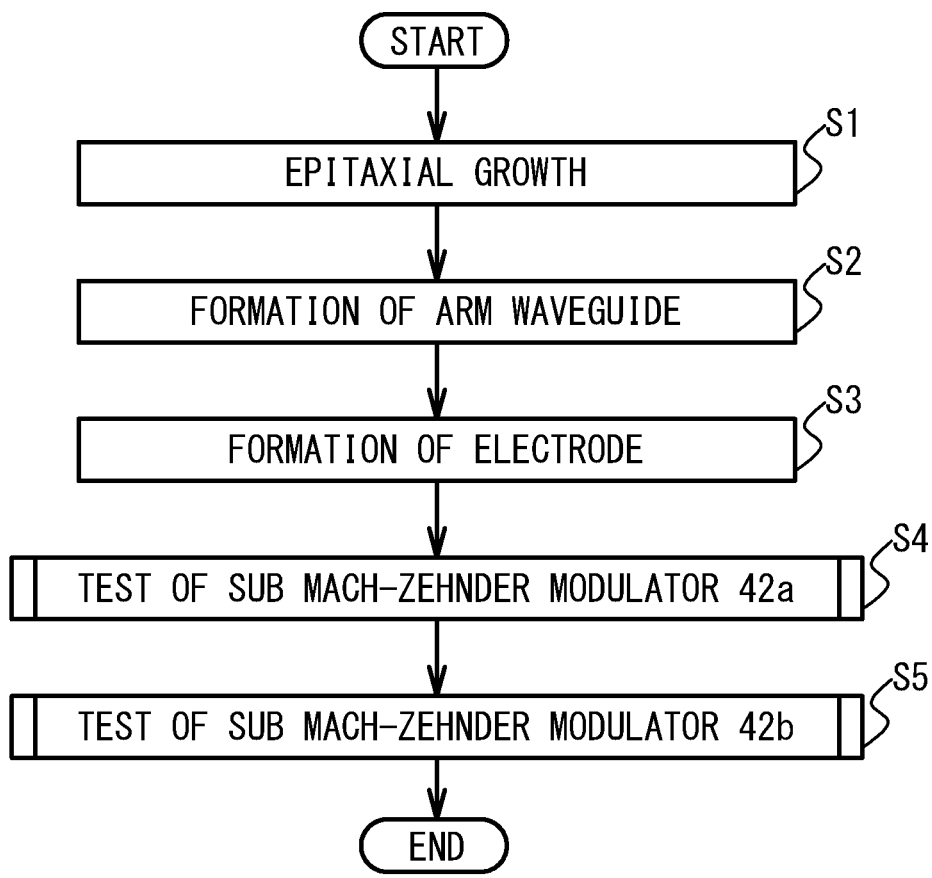
FIG. 8 is a flowchart illustrating a method of manufacturing an optical modulator.

FIG. 8 is a flow chart illustrating a method for manufacturing optical modulator 40a, including the step of optimizing the voltage. As illustrated in FIG. 8, a Mach-Zehnder modulator is formed (steps S1 to S3). Cladding layer 82, core layer 84, cladding layer 86, and contact layer 88 are epitaxially grown on an upper surface of a wafer (semiconductor substrate 80) by a metal organic chemical vapor deposition (MOCVD) method or the like. The n-type cladding layer 82, the p-type cladding layer 86, and contact layer 88 are formed by adding a dopant to the source gas (step S1). When the amount of thermal diffusion of the dopant varies, the phase adjusting efficiency also varies as illustrated in FIG. 4A and FIG. 4B, and FIG. 7A and FIG. 7B.

A mesa-shaped arm waveguide as illustrated in FIG. 2B is formed by dry etching or the like (step S2). Insulating film 81 and resin layer 85 are formed. Openings are formed in insulating film 81 and resin layer 85 by dry etching or the like. Electrodes (modulation electrode, phase adjusting electrode and ground electrode) are formed by vacuum evaporation or the like (step S3). Sub Mach-Zehnder modulators 42a and 42b and main Mach-Zehnder modulator 44a are formed on semiconductor substrate 80. The wafer is diced to form a plurality of optical modulators 40a.

Each of the plurality of optical modulators 40a is disposed on substrate 41, and is electrically connected to ABC circuit 24 and driver IC 26. Testing is performed for each optical modulator 40a. Specifically, sub Mach-Zehnder modulator 42a is tested and the voltages applied to modulation electrodes 66a and 66b are optimized (step S4). Testing of sub Mach-Zehnder modulator 42b is performed, and the voltages applied to modulation electrodes 66d and 66e are optimized (step S5). Optical modulator 40a is formed by the above steps.

(Testing)

Figure 9:
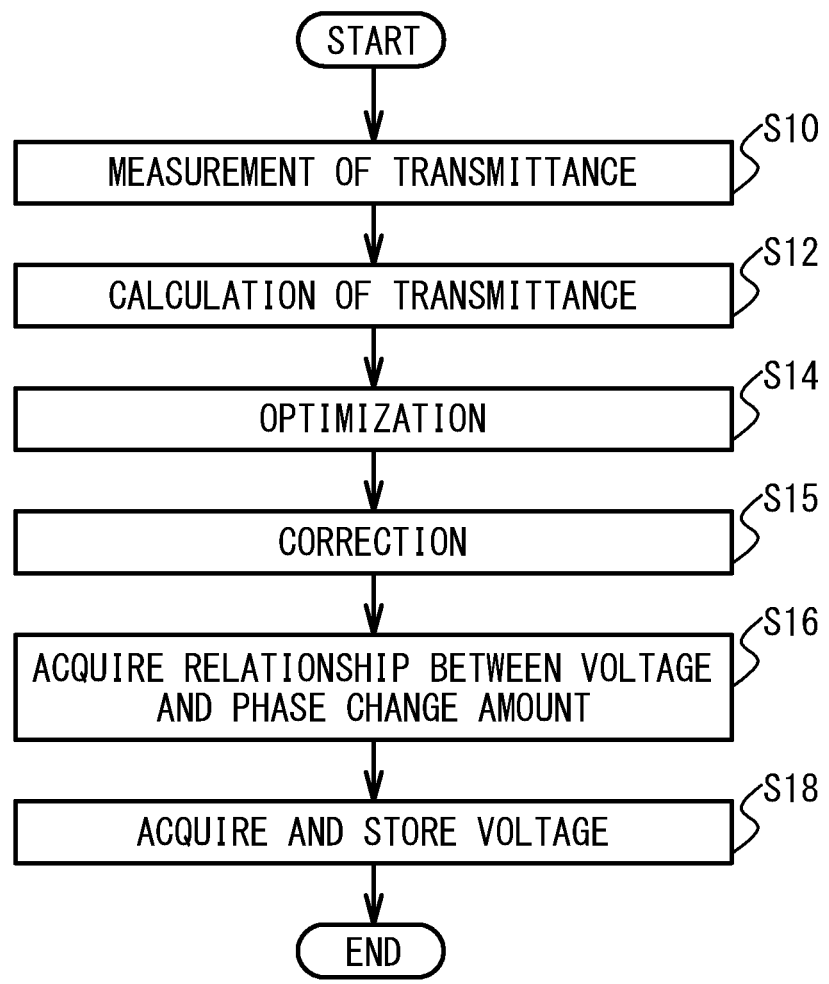
FIG. 9 is a flowchart illustrating a testing.

FIG. 9 is a flow chart illustrating the testing. Each of steps S4 and S5 in FIG. 8 is a step of performing the testing illustrated in FIG. 9.

When testing sub Mach-Zehnder modulator 42a (step S4 in FIG. 8), phase control unit 12 of control unit 10 applies a voltage to phase adjusting electrode of sub Mach-Zehnder modulator 42b to adjust the operating point of sub Mach-Zehnder modulator 42b to the extinction point. Laser control unit 14 of control unit 10 drives wavelength tunable laser element 22 and causes light to enter optical modulator 40a from wavelength tunable laser element 22. A light receiving element (not illustrated) receives light emitted from sub Mach-Zehnder modulator 42a. Control unit 10 measures a light transmittance in arm waveguide by comparing the intensity of incident light with the intensity of the emitted light.

Control unit 10 measures the light transmittance (first transmittance) in arm waveguide 54a of sub Mach-Zehnder modulator 42a while sweeping the voltage applied from ABC circuit 24 to phase adjusting electrode 68a of sub Mach-Zehnder modulator 42a. Control unit 10 measures the light transmittance (first transmittance) in arm waveguide 54b of sub Mach-Zehnder modulator 42a while sweeping the voltage applied from ABC circuit 24 to phase adjusting electrode 68b (step S10 in FIG. 9). Calculation unit 15 of control unit 10 calculates a light transmittance (second transmittance) in arm waveguide 54a and a light transmittance (second transmittance) in arm waveguide 54b (step S12).

Calculation unit 15 performs optimization of the transmittance so that the transmittance calculated in step S12 approaches the transmittance measured in step S10 (step S14). Parameters (coefficients) are obtained by the optimization of the transmittance. The parameters are corrected based on a ratio of the lengths of the phase adjusting electrode and the modulation electrode (step S15). Calculation unit 15 acquires the relationship between the voltage applied to the modulation electrode and the phase change amount in the arm waveguide (step S16). Storage control unit 18, based on the relationship between the voltage and the phase change amount, acquires a voltage in which the phase change amount has a predetermined magnitude, and stores the voltage in, for example, storage device 34 (step S18).

Testing will be specifically described. Calculation unit 15 calculates the transmittance T as a function of the change amount $\Delta L1$ of absorption loss, the initial phase shift $\varphi 0$, and the phase change amount $\Delta \varphi$. Calculation unit 15 calculates the phase change amount $\Delta \varphi$ in one arm waveguide as a function of the applied voltage V applied to the phase adjusting electrode as expressed in the following equation.

$$\Delta \varphi = k1 \times V + k2 \times V^2 + k3 \times V^3 + k4 + k5 \times V^4 + k5 \times V^5 + k6 \times V^6 \quad \text{[Equation 5]}$$

An example of the initials value of the coefficient is illustrated below.

$$k1=1\times 10^{-1} \ (\pi/V), k2=1\times 10^{-2} \ (\pi/V^2), k3=1\times 10^{-5} \ (\pi/V^3), k4=1\times 10^{-6} \ (\pi/V^4), k5=1\times 10^{-7} \ (\pi/V^5), k6=1\times 10^{-8} \ (\pi/V^6)$$

Figure 10A:
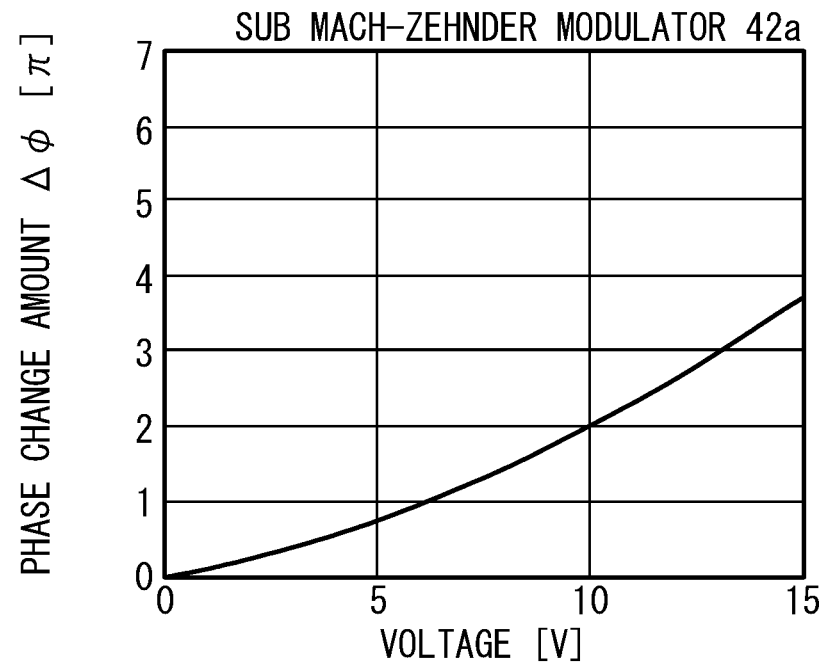
FIG. 10A is a diagram illustrating a calculated phase change amount.

FIG. 10A is a diagram illustrating a calculated phase change amount. The horizontal axis represents the voltage applied to phase adjusting electrodes 68a and 68b of sub Mach-Zehnder modulator 42a. The vertical axis represents the phase change amount $\Delta \varphi$. The solid line represents the phase change amount of arm waveguide 54a on the p-side and the phase change amount of arm waveguide 54b on the n-side. Since calculation unit 15 performs the calculation using the same function (Equation 5) and the same coefficients (initial values) for arm waveguides 54a and 54b, the phase change amount $\Delta \varphi$ becomes equal between the arm waveguides.

Calculation unit 15 calculates the change amount $\Delta L1$ of the absorption loss of light in the arm waveguide as a function of the voltage V applied to the phase adjusting electrode as in the following equation.

$$\Delta L1 = a1 \times (1 - \exp(-V/a2)) \quad \text{[Equation 6]}$$

The initial values of the coefficients a1 and a2 are illustrated below.

$$a1=1\times 10^{-4} \ (dB), a2=1.5 \ (V).$$

Figure 10B:
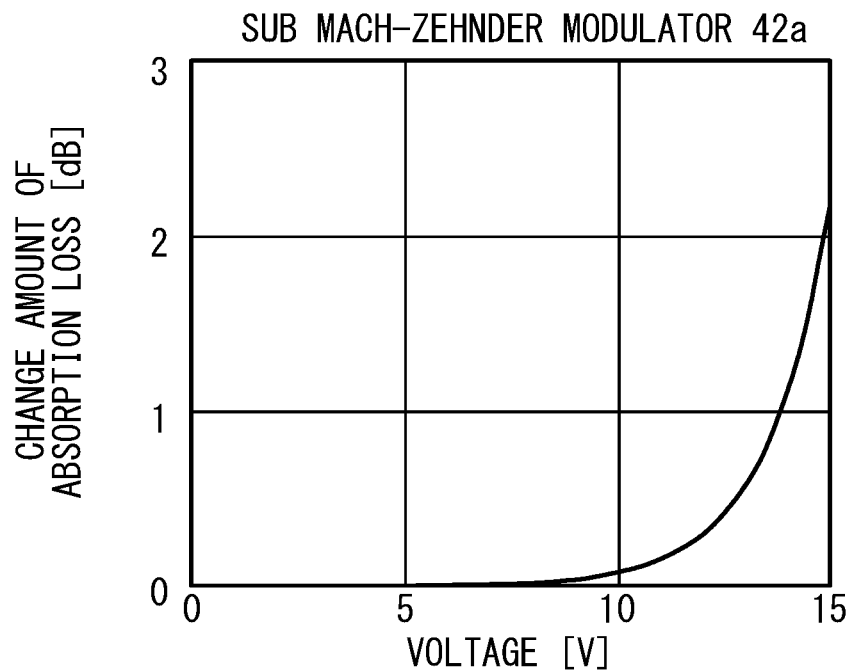
FIG. 10B is a diagram illustrating a calculated change amount of absorption loss.

FIG. 10B is a diagram illustrating a calculated change amount of absorption loss. The horizontal axis represents the voltage applied to phase adjusting electrodes 68a and 68b of sub Mach-Zehnder modulator 42a. The vertical axis represents the change amount $\Delta L1$ of absorption loss. The solid line represents the change amount $\Delta L1$ of arm waveguide 54a and the change amount $\Delta L1$ of arm waveguide 54b. Since the calculation is performed using the same function (Equation 6) and the same coefficients for arm waveguides 54a and 54b, the change amounts $\Delta L1$ of absorption loss of light in the arm waveguides are also the same as each other.

Calculation unit 15 calculates the transmittance T (step S12). The transmittance T in each arm waveguide is expressed as a function of the change amount $\Delta L1$ of absorption loss, the initial phase shift $\varphi 0$, and the phase change amount $\Delta \varphi$.

$$T = (1 + 10^{\wedge}(\Delta L1/10) + 2\times 10^{\wedge}(\Delta L1/20) \times \cos(\varphi 0 \pm \Delta \varphi))/(1+10^{\wedge}(\Delta L1/10))^2 \quad \text{[Equation 7]}$$

The phase change amount $\Delta \varphi$ is expressed by Equation 5. The change amount $\Delta L1$ of absorption loss is expressed by Equation 6. The sign in the cosine function "cos" of Equation 7 is positive for the arm waveguide on the p-side and negative for the arm waveguide on the n-side. The initial phase shift $\varphi 0$ is expressed by the following equation. In Equation 8, "acos" denotes an inverse cosine function.

$$\varphi 0 = \pm \mathrm{acos}(T0^{0.5}) \quad \text{[Equation 8]}$$

T0 is the transmittance when the applied voltage is 0 V and is measured in step S10. When the voltage applied to phase adjusting electrode 68a is swept, the sign of the initial phase shift $\varphi 0$ is positive in case the first peak of the transmittance is the minimum peak, and is negative in case the first peak is the maximum peak. In the example of sub Mach-Zehnder modulator 42a, $\varphi 0$ is equal to 0.4 $\pi$.

Figure 11A:
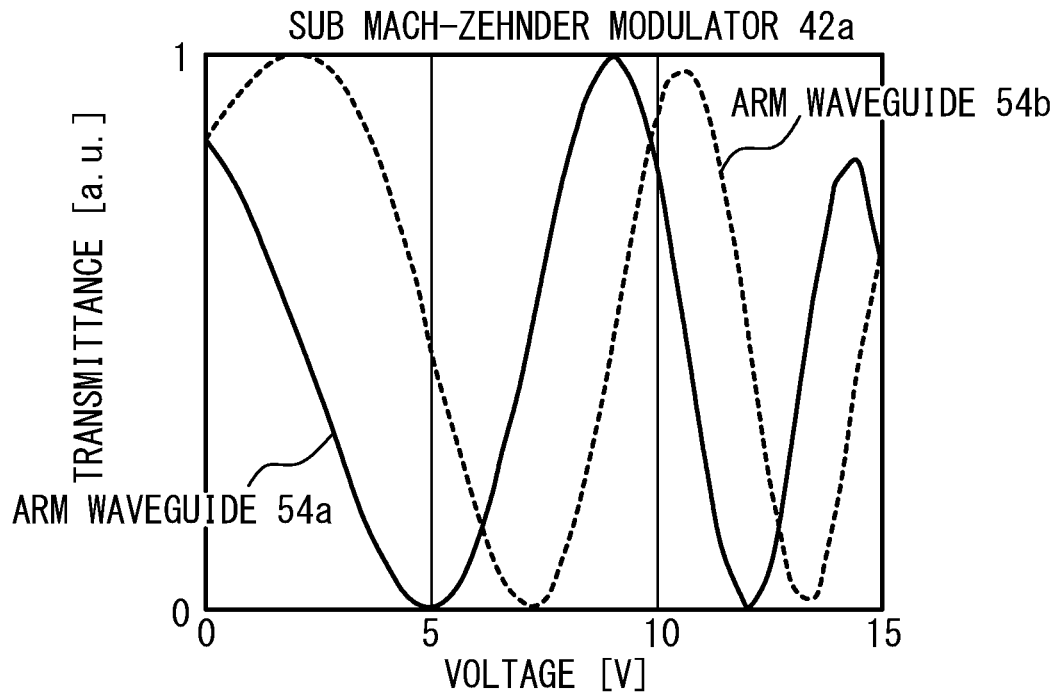
FIG. 11A is a diagram illustrating a calculated transmittance.
Figure 11B:
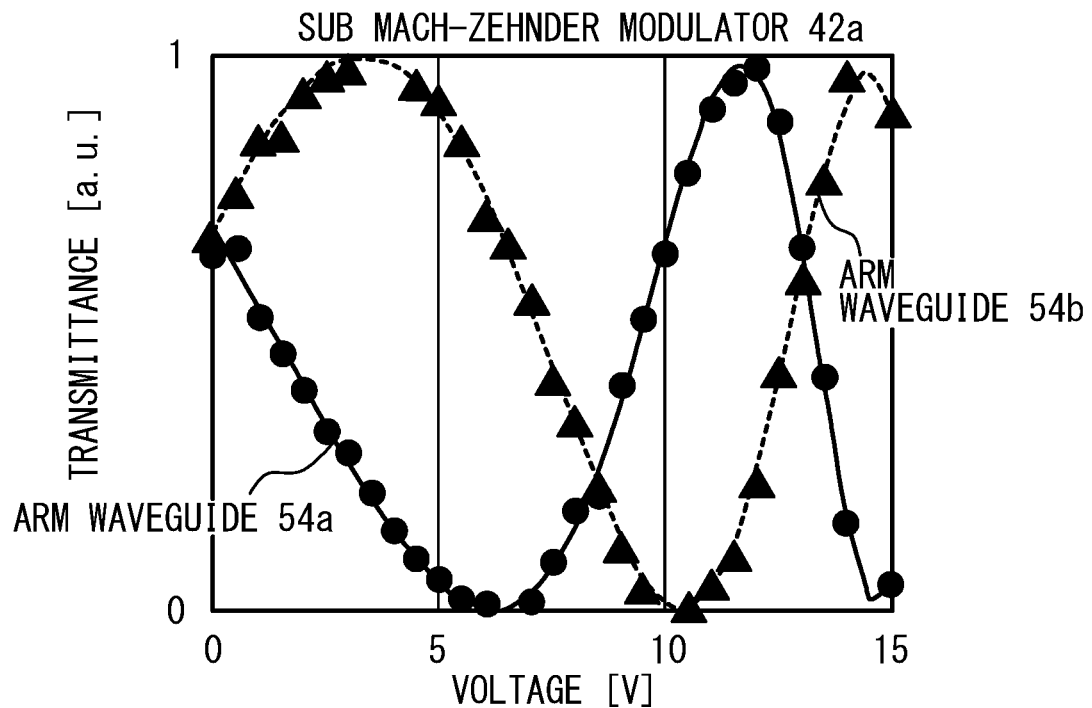
FIG. 11B is a diagram illustrating measured transmittance and transmittance after optimization.

FIG. 11A is a diagram illustrating calculated transmittances. FIG. 11B is a diagram illustrating measured transmittances and transmittances after optimization. The horizontal axes in FIGS. 11A and 11B represent the voltage applied to the phase adjusting electrode of sub Mach-Zehnder modulator 42a. The vertical axes represent light transmittances.

The solid line in FIG. 11A represents the transmittance of arm waveguide 54a on the p-side. The dotted line represents the transmittance of arm waveguide 54b on the n-side. The transmittance illustrated in FIG. 11A is calculated by calculation unit 15 using Equation 7 and the initial value in step S12 of FIG. 9. The solid line in FIG. 11B represents the transmittance after optimization of arm waveguide 54a. The dotted line represents the transmittance after optimization of arm waveguide 54b. Circles represent the measurement result of the transmittance of arm waveguide 54a. Triangles represent the measurement result of the transmittance of arm waveguide 54b.

The optimization in step S14 in FIG. 9 means that the transmittance calculated in step S12 is brought close to the transmittance measured in step S10 to reduce the error therebetween. The transmittance illustrated by the solid line in FIG. 11B varies from the transmittance illustrated by the solid line in FIG. 11A and approaches the measured transmittance illustrated by the circle in FIG. 11B. The transmittance illustrated in dotted lines in FIG. 11B varies from the transmittance illustrated in dotted lines in FIG. 11A and approaches the measured transmittance illustrated in triangles in FIG. 11B.

By optimizing the transmittance, the initial phase shift $\varphi 0$, the phase change amount $\Delta \varphi$, and the change amount $\Delta L1$ of the absorption loss included in the equation (Equation 7) of the transmittance change. The phase change amount $\Delta \varphi$ and the absorption loss change amount $\Delta L1$ are functions indicating more accurately the relationship with the voltage.

More specifically, the coefficients k1 to k6 in the Equation 5 of the phase change amount $\Delta \varphi$ and the coefficients a1 and a2 in the Equation 6 of the change amount $\Delta L1$ change from the initial values. The coefficients after optimization are illustrated below.

Coefficients for arm waveguide 54a $$k1=8.36\times 10^{-2} \ (\pi/V), k2=2.14\times 10^{-3} \ (\pi/V^2), k3=1.33\times 10^{-6} \ (\pi/V^3), k4=1.37\times 10^{-5} \ (\pi/V^4), k5=3.15\times 10^{-7} \ (\pi/V^5), k6=9.54\times 10^{-9} \ (\pi/V^6), a1=4.18\times 10^{-4} \ (dB), a2=2.24 \ (V)$$

Coefficients arm waveguide for arm waveguide 54b $$k1=1.09\times 10^{-1} \ (\pi/V), k2=1.28\times 10^{-3} \ (\pi/V^2), k3=9.04\times 10^{-7} \ (\pi/V^3), k4=6.66\times 10^{-6} \ (\pi/V^4), k5=9.04\times 10^{-8} \ (\pi/V^5), k6=1.98\times 10^{-8} \ (\pi/V^6), a1=8.96\times 10^{-4} \ (dB), a2=2.60 \ (V)$$

The initial phase shift $\varphi$ 0 after optimization of transmittance is 0.38 $\pi$.

These coefficients represent the relationship between the voltage applied to the phase adjusting electrode and the phase change amount. In order to obtain the relationship between the voltage applied to the modulation electrode and the phase change amount, the above coefficients are corrected.

As illustrated in FIG. 2A, the modulation electrode and the phase adjusting electrode are provided on the arm waveguide. It is assumed that the change amount of the phase per unit length of the phase adjusting electrode when the voltage is applied to the phase adjusting electrode is equal to the change amount of the phase per unit length of the modulation electrode when the voltage is applied to the modulation electrode. The length of the modulation electrode is greater than the length of the phase adjusting electrode, for example, 2.5 times the length of the phase adjusting electrode. It is assumed that the phase change amount when a voltage is applied to the modulation electrode changes at a ratio similar to the ratio of the length compared to the phase change amount when a voltage is applied to the phase adjusting electrode.

Calculation unit 15 calculates the following coefficients by multiplying each of k1 to k6 and a1 among the above coefficients by 2.5 times, based on the ratio of the lengths of the electrodes (step S15 in FIG. 9).

Coefficients for arm waveguide 54a $k1=2.09\times10^{-1}$ ($\pi$/V), $k2=5.34\times10^{-3}$ ($\pi$/V$^2$), $k3=3.32\times10^{-6}$ ($\pi$/V$^3$), $k4=3.42\times10^{-5}$ ($\pi$/V$^4$), $k5=7.88\times10^{-7}$ ($\pi$/V$^5$), $k6=2.38\times10^{-8}$ ($\pi$/V$^6$), $a1=1.05\times10^{-3}$ (dB)

Coefficients for arm waveguide 54b $k1=2.73\times10^{-1}$ ($\pi$/V), $k2=3.21\times10^{-3}$ ($\pi$/V$^2$), $k3=2.26\times10^{-6}$ ($\pi$/V$^3$), $k4=1.66\times10^{-5}$ ($\pi$/V$^4$), $k5=2.26\times10^{-7}$ ($\pi$/V$^5$), $k6=4.96\times10^{-8}$ ($\pi$/V$^6$), $a1=2.24\times10^{-3}$ (dB)

a2 is the same as a2 before correction such as k1. Calculation unit 15 calculates the phase change amount and the absorption loss change amount when a voltage is applied to the modulation electrode by applying these coefficients to Equations 5 and 6.

Figure 12A:
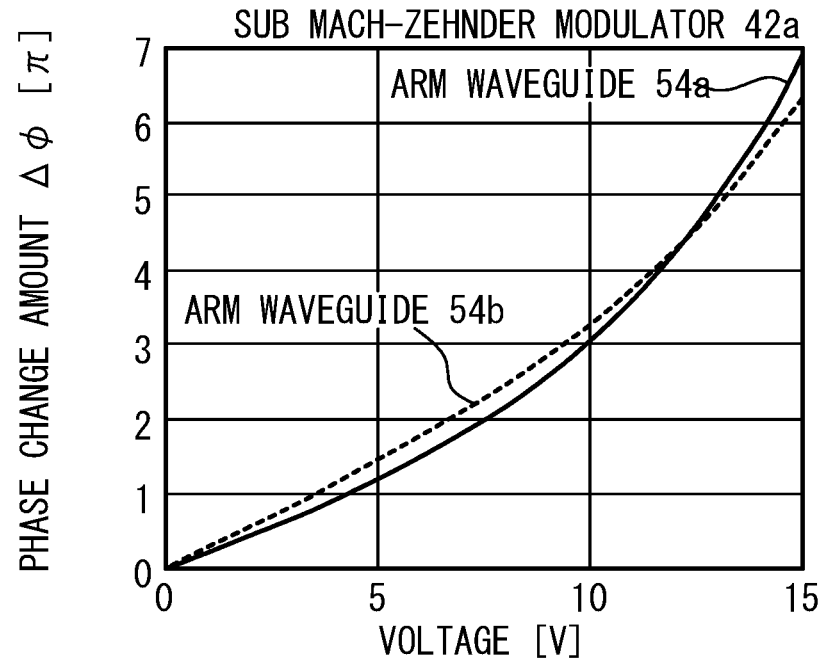
FIG. 12A is a diagram illustrating a phase change amount after optimization.

FIG. 12A is a diagram illustrating phase change amounts after the optimization. The horizontal axis represents voltages applied to the modulation electrodes 66a and 66b of sub Mach-Zehnder modulator 42a. The vertical axis represents phase change amount $\Delta\varphi$. The solid line represents the phase change amount of arm waveguide 54a on the p-side. The dotted line represents the phase change amount of arm waveguide 54b on the n-side. As illustrated in FIG. 12A, the phase change amount close to that illustrated in FIG. 6A is obtained by substituting the coefficients obtained by the optimization of transmittance and the correction into Equation 5.

Figure 12B:
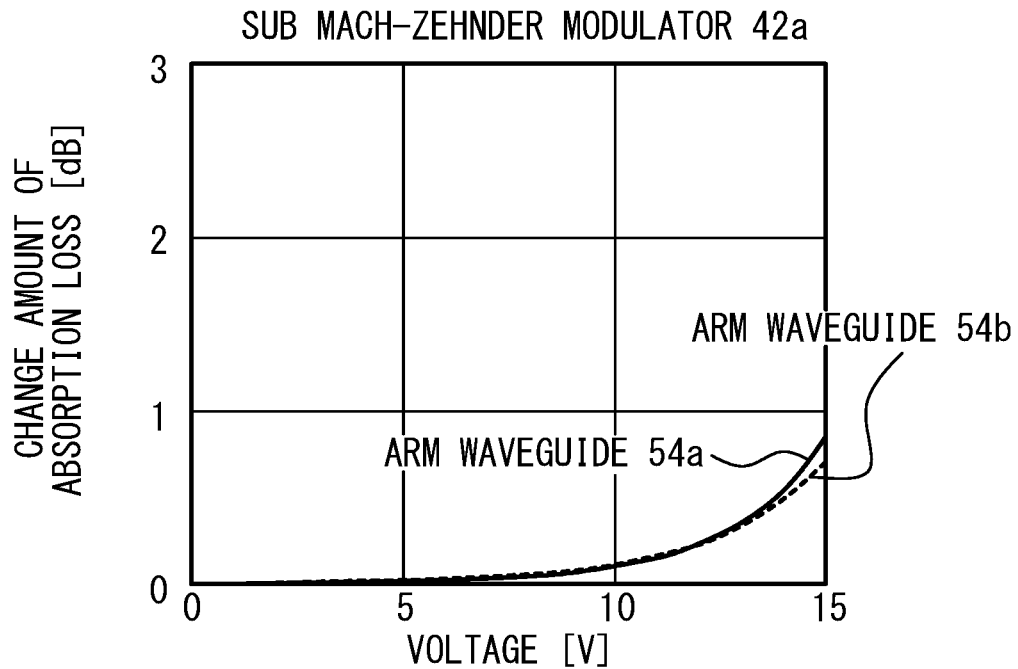
FIG. 12B is a diagram illustrating a change amount of absorption loss after optimization.

FIG. 12B is a diagram illustrating change amounts of absorption losses after the optimization. The horizontal axis represents voltages applied to modulation electrodes 66a and 66b of sub Mach-Zehnder modulator 42a. The vertical axis represents the change amount of the absorption loss. The solid line represents the change amount of absorption loss of arm waveguide 54a on the p-side. The dotted line represents the change amount of absorption loss of arm waveguide 54b on the n-side. As illustrated in FIG. 12B, the change amount close to that illustrated in FIG. 7A is obtained by substituting the coefficients obtained by the optimization of transmittance and the correction into Equation 6.

Figure 13:
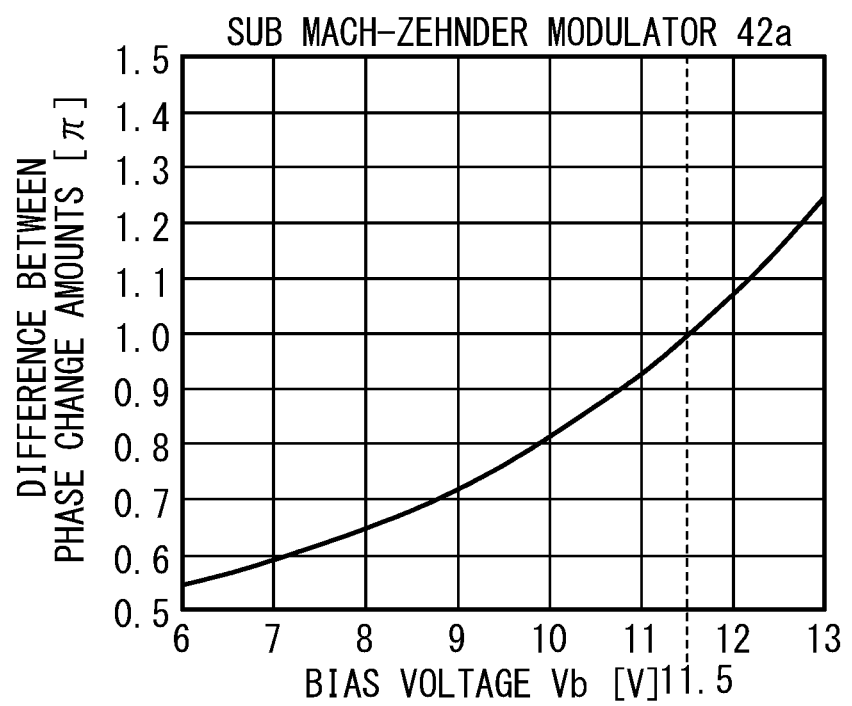
FIG. 13 is a diagram illustrating a relationship between a bias voltage and a difference of a phase change amount.

FIG. 13 is a diagram illustrating the relationship between the bias voltage and a difference in the phase change amounts. The horizontal axis represents the bias voltage Vb. The vertical axis represents the difference between the phase change amount in arm waveguide 54a and the phase change amount in arm waveguide 54b when the voltage Vb+Vpp/2 is applied to modulation electrode 66a and the voltage Vb-Vpp/2 is applied to modulation electrode 66b. In order to suppress an increase in power consumption of driver IC 26, Vpp is set to be equal to 1.7 V. For each bias voltage Vb on the horizontal axis in FIG. 13, a predetermined swing voltage Vpp=1.7 V is applied, and the difference in the phase change amounts is obtained. The difference in the phase change amounts between arm waveguide 54a and arm waveguide 54b may be $\pi$. As illustrated in FIG. 13, when Vb is equal to 11.5 V, the difference in the phase change amounts is $\pi$. Storage device 34 illustrated in FIG. 1B stores the bias voltage Vb of sub Mach-Zehnder modulator 42a as 11.5 V.

Next, the testing of sub Mach-Zehnder modulator 42b is performed (step S5 in FIG. 8). Phase control unit 12 of control unit 10 applies a voltage to the phase adjusting electrode of sub Mach-Zehnder modulator 42a to adjust the operating point of sub Mach-Zehnder modulator 42a to the extinction point. Control unit 10 measures the light transmittance in arm waveguides 54c and the 54d of sub Mach-Zehnder modulator 42b while sweeping the voltage applied from ABC circuit 24 to the phase adjusting electrode of sub Mach-Zehnder modulator 42b (step S10 in FIG. 9). Calculation unit 15 of control unit 10 calculates the light transmittance in arm waveguide 54c and the light transmittance in arm waveguide 54d (step S12).

Calculation unit 15 performs an optimization such that the transmittance calculated in step S12 approaches the transmittance measured in step S10 (step S14). Calculation unit 15 corrects the parameters based on the ratio of the lengths of the phase adjusting electrode and the modulation electrode (step S15). Calculation unit 15 acquires the relationship between the voltage applied to the modulation electrode and the phase change amount (step S16). Based on the relationship between the voltage and the phase change amount, storage control unit 18 acquires the voltage in which the phase change amount has a predetermined amount, and stores the voltage in storage device 34 (step S18).

Figure 14:
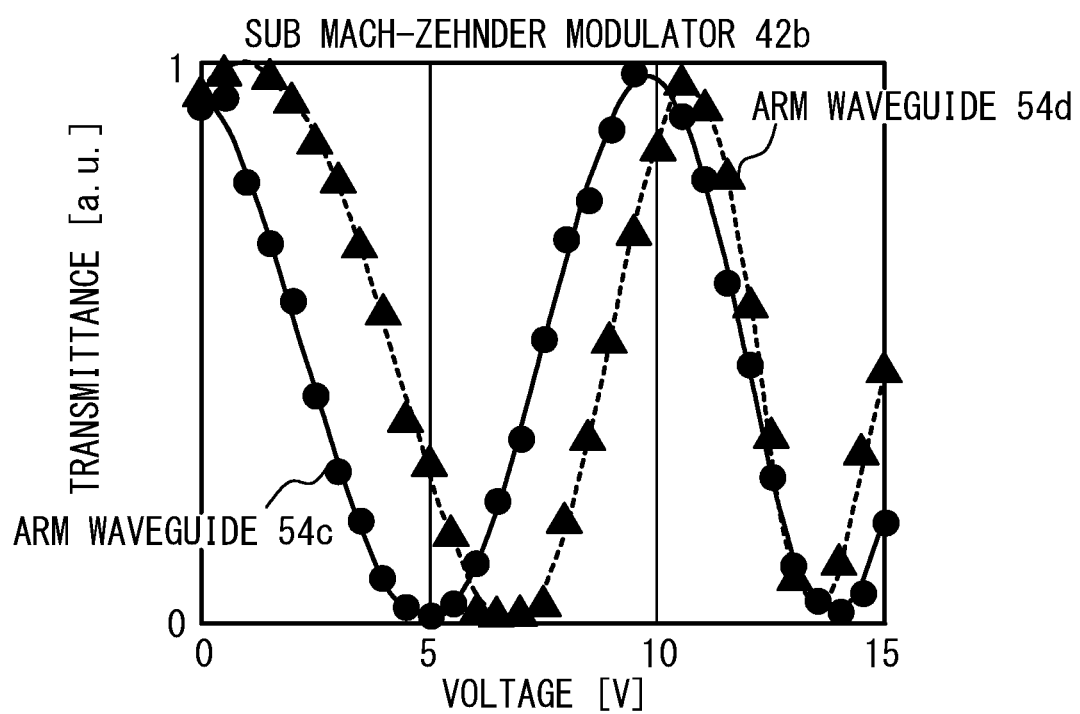
FIG. 14 is a diagram illustrating a measured transmittance and transmittance after optimization.

FIG. 14 is a diagram illustrating the measured transmittances and the transmittances after the optimization. The horizontal axis represents the voltage applied to phase adjusting electrodes 68d and 68e of sub Mach-Zehnder modulator 42b. The vertical axis represents the light transmittance. The solid line represents the transmittance after optimization of arm waveguide 54c on the p-side. The dotted line represents the transmittance after optimization of arm waveguide 54d on the n-side. The circles represent the measurement result of the transmittance of arm waveguide 54c. The triangles represent the measurement result of the transmittance of arm waveguide 54d. By optimizing the transmittance, the phase change amount and the absorption loss change amount are obtained.

Figure 15A:
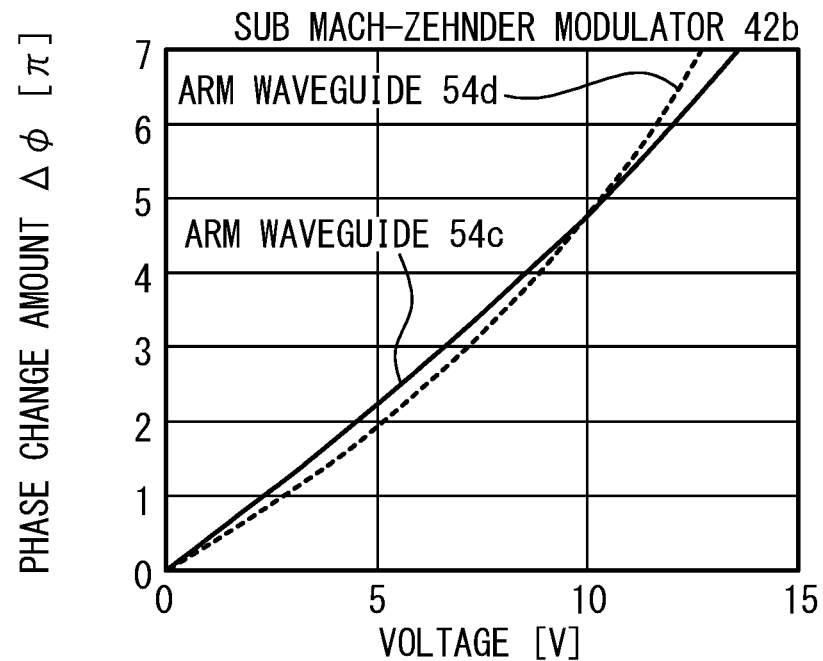
FIG. 15A is a diagram illustrating a phase change amount after optimization.

FIG. 15A is a diagram illustrating the phase change amounts after optimization. The horizontal axis represents the voltages applied to modulation electrodes 66d and 66e of sub Mach-Zehnder modulator 42b. The vertical axis represents the phase change amount $\Delta\varphi$. The solid line represents the phase change amount of arm waveguide 54c on the p-side. The dotted line represents the phase change amount of arm waveguide 54d on the n-side. As illustrated in FIG. 15A, the phase change amount close to that illustrated in FIG. 6B is obtained by substituting the coefficients obtained by the optimization of transmittance and the correction into Equation 5.

Figure 15B:
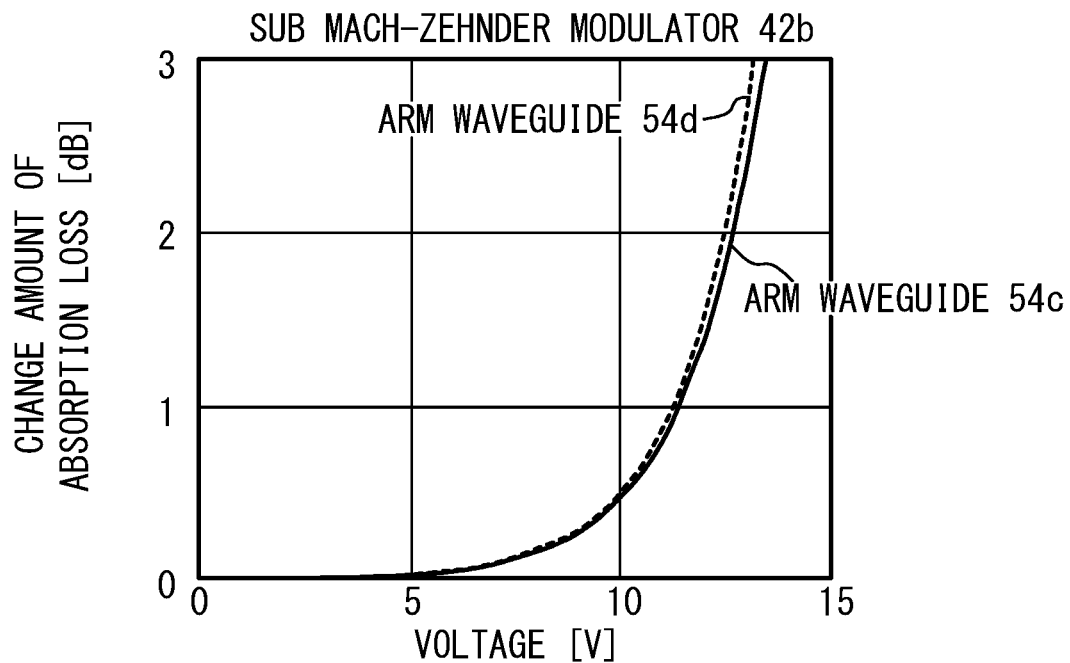
FIG. 15B is a diagram illustrating a change amount of absorption loss after optimization.

FIG. 15B is a diagram illustrating change amounts of absorption losses after the optimization. The horizontal axis represents voltages applied to modulation electrodes 66d and 66e of sub Mach-Zehnder modulator 42b. The vertical axis represents the change amount of absorption losses. The solid line represents the change amounts of absorption loss of arm waveguide 54c on the p-side. The dotted line represents the change amount of absorption loss of arm waveguide 54d on the n-side. As illustrated in FIG. 15B, the change amount close to that illustrated in FIG. 7B is obtained by substituting the coefficients obtained by the optimization of transmittance and the correction into Equation 6.

Figure 16:
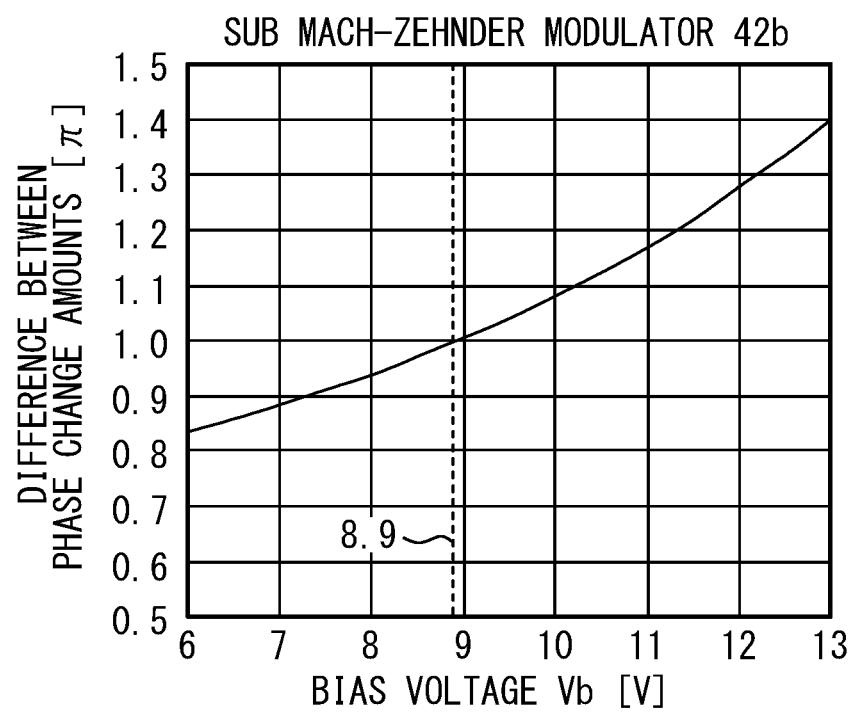
FIG. 16 is a diagram illustrating a relationship between a bias voltage and a difference phase change amount.

FIG. 16 is a diagram illustrating the relationship between the bias voltage and the difference of the phase change amounts. The horizontal axis represents the bias voltage Vb. The vertical axis represents the difference between the phase change amount in arm waveguide 66d and the phase change amount in arm waveguide 66e when the voltage Vb+Vpp/2 is applied to modulation electrode 54c and the voltage Vb-Vpp/2 is applied to modulation electrode 54d. For each bias voltage Vb on the horizontal axis, a predetermined swing voltage Vpp=1.7 V is applied, and the difference in the phase change amounts is obtained. The phase change amount difference may be π. As illustrated by the dotted line in FIG. 16, when Vb is equal to 8.9 V, the phase change amount difference is π. Storage device 34 illustrated in FIG. 1B stores the bias voltage Vb of sub Mach-Zehnder modulator 42b as 8.9 V.

Table 1 is an example of a data table stored in storage device 34.

TABLE 1

|     | Vb [V] |
|-----|--------|
| Ich | 11.5   |
| Qch | 8.9    |

The bias voltage Vb on the Ich side (sub Mach-Zehnder modulator 42a) is 11.5 V. The bias voltage Vb on the Qch side (sub Mach-Zehnder modulator 42b) is 8.9 V.

According to the first embodiment, control unit 10 acquires the relationship between the voltage applied to the modulation electrode and the phase change amount, and acquires the voltage in which the phase change amount at the time of modulation has a predetermined magnitude. By applying the optimized voltage to the Mach-Zehnder optical modulator, light is modulated. The phase change amount at the time of modulation can be set to a predetermined magnitude, and the increase in the absorption loss of light can be suppressed.

Optical modulator 40a has two sub Mach-Zehnder modulators 42a and 42b. The phase adjusting efficiency of sub Mach-Zehnder modulator 42b is higher than that of sub Mach-Zehnder modulator 42a. When the same bias voltage as that of sub Mach-Zehnder modulator 42b is applied to sub Mach-Zehnder modulator 42a, the absorption loss of light in sub Mach-Zehnder modulator 42b becomes larger than that in sub Mach-Zehnder modulator 42a. As illustrated in FIG. 15B, when the bias voltage Vb of sub Mach-Zehnder modulator 42b is 11.5 V which is equal to the bias voltage of sub Mach-Zehnder modulator 42a, the change amount of the absorption loss is 1.1 dB.

By the testing of FIG. 9, the voltage is optimized for each sub Mach-Zehnder modulator. As illustrated in Table 1, the bias voltage Vb of sub Mach-Zehnder modulator 42a is set to 11.5 V, and the bias voltage Vb of sub Mach-Zehnder modulator 42b is set to 8.9 V. The phase change amount of sub Mach-Zehnder modulator 42a and the 42b can be set to the predetermined magnitude, and the increase in light absorption loss can be suppressed. By setting the bias voltage Vb of sub Mach-Zehnder modulator 42b to 8.9 V, the change amount of absorption loss can be reduced to 0.26 dB.

As illustrated in FIG. 13, control unit 10 acquires the voltage in which the difference between the phase change amount in arm waveguide 54a and the phase change amount in arm waveguide 54b is π during modulation in sub Mach-Zehnder modulator 42a. As illustrated in FIG. 16, control unit 10 acquires the voltage in which the difference of the phase change amounts becomes π also in sub Mach-Zehnder modulator 42b. As illustrated in FIG. 4A to FIG. 5B, the output light of each arm waveguide rotates by ±π/2. For example, in FIG. 4A, compared with FIG. 3, the phase of the output light Ip of arm waveguide 54a and the phase of the output light Qp of arm waveguide 54c are rotated by +π/2. The phase of the output light In of arm waveguide 54b and the phase of the output light Qn of arm waveguide 54d are rotated by −π/2. In the modulation of the QPSK system, the modulated light is maximized.

The sub Mach-Zehnder modulators are differentially driven. When modulation is not performed, Vpp is equal to 0, and the bias voltages Vb are applied to the modulation electrodes. As illustrated in FIG. 3, the phase shift between two paired arm waveguides is π. For example, when the modulation signal is the symbol code 00, the voltage applied to modulation electrode 66a of sub Mach-Zehnder modulator 42a and modulation electrode 66d of sub Mach-Zehnder modulator 42b is Vb+Vpp/2. The phase of the light is rotated by π/2 by the voltage Vpp/2. The voltage applied to modulation electrode 66b and modulation electrode 66e is Vb-Vpp/2. The phase of the light is rotated by −π/2 by the voltage −Vpp/2 (FIG. 4A). By combining these lights, the output light at the time of modulation becomes maximum.

The Mach-Zehnder optical modulator may be driven by a method other than differential driving. Regardless of a driving method, the phase change amount of the Mach-Zehnder optical modulator can be controlled with an optimum voltage and the increase of absorption loss can be suppressed.

The phase change amount of each arm waveguide at the time of modulation may be a value other than ±π/2 according to a modulation method or the like. Control unit 10 acquires the voltage in which the phase change amount has a predetermined magnitude. The modulation method may be, for example, a quadrature amplitude modulation (QAM) method other than QPSK. In the QAM modulation method, phase modulation and amplitude modulation are combined.

In order to suppress an increase in power consumption of driver IC 26, the swing voltage Vpp is preferably 1.7 V or less, for example. As illustrated in FIG. 13, when the swing voltage Vpp is set to a predetermined value such as 1.7 V, a bias voltage Vb in which the difference of the phase change amount between the two arm waveguides becomes π is acquired.

By setting the bias voltage Vb to an optimum magnitude, the phase change amount can be set to the predetermined magnitude, and the increase in light absorption loss can be suppressed. Since the swing voltage Vpp is 1.7 V, the power consumption of driver IC 26 can be reduced. The upper limit of the swing voltage Vpp may be a value other than 1.7 V.

As illustrated in FIG. 2A, modulation electrode 66a and phase adjusting electrode 68a are provided on arm waveguide 54a. Modulation electrode 66b and phase adjusting electrode 68b are provided on arm waveguide 54b. Modulation electrodes 66a and 66b are connected to the same termination element 78a. Therefore, it is difficult to make the direct-current (DC) voltage applied to modulation electrode 66a different from the DC voltage applied to modulation electrode 66b. It is also difficult to measure the transmittance while sweeping the voltage to the modulation electrode. Meanwhile, the DC voltage applied to phase adjusting electrode 68a may be different from the DC voltage applied to phase adjusting electrode 68b. It is possible to measure the transmittance while sweeping the voltage to phase adjusting electrode.

Control unit 10 acquires the relationship between the voltage applied to the phase adjusting electrode and the phase change amount (step S14 in FIG. 9, Equation 5). Control unit 10 corrects the coefficients based on the ratio of the lengths of the modulation electrode and the phase adjusting electrode, and acquires the relationship between the voltage applied to the modulation electrode and the phase change amount (steps S15 and S16). Control unit 10 acquires a voltage in which the phase change amount in each arm waveguide becomes, for example, π/2 (step S18). The phase change amount can be set to the predetermined value, and the increase in light absorption loss can be suppressed.

More specifically, control unit 10 measures the transmittance while sweeping the voltage applied to the phase adjusting electrode in step S10 of FIG. 9, and calculates the transmittance in step S12. As illustrated in FIG. 11B and FIG. 14, control unit 10 performs fitting of the transmittance to bring the calculated transmittance close to the measured transmittance. The transmittance illustrated in Equation 7 is a function of the phase change amount $\Delta\varphi$. The phase change amount $\Delta\varphi$ illustrated in Equation 5 is a function of the voltage applied to the phase adjusting electrode. By fitting the transmittance, the coefficients in Equation 5 become more appropriate values. The ratio of the length of the modulation electrode to the length of the phase adjusting electrode is, for example, 2.5. According to the ratio, the coefficients are multiplied by a constant of the ratio (for example, 2.5 times). A highly accurate relationship between the voltage applied to the modulation electrode and the phase change amount can be obtained by applying the coefficient multiplied by the constant into Equation 5. Control unit 10 acquires the voltage applied to the modulation electrode when the phase change amount has a predetermined magnitude. The phase change amount can be set to the predetermined magnitude, and the increase in light absorption loss can be suppressed. The transmittance, the phase change amount, and the absorption loss change amount may be calculated from expressions other than the above-described expressions.

As illustrated in FIG. 2B, each of arm waveguides 54a and 54b has cladding layer 82, core layer 84, cladding layer 86 and contact layer 88. The other arm waveguides have the same configuration. Cladding layer 82 is an n-type semiconductor layer. Cladding layer 86 and contact layer 88 are p-type semiconductor layers. Dopants are added to obtain n-type and p-type conductivity types. When the amount of thermal diffusion of the dopants varies, the phase adjusting efficiency of the Mach-Zehnder optical modulator also varies. According to the first embodiment, the voltage in which the phase change amount has a predetermined magnitude is acquired for each Mach-Zehnder optical modulator. By driving the Mach-Zehnder optical modulator with the voltage corresponding to the phase adjusting efficiency, the phase of light at the time of modulation can be set to the predetermined magnitude, and the increase in absorption loss can be suppressed.

In the examples illustrated in FIGS. 13 and 16, control unit 10 calculates the phase change amount by changing the bias voltage Vb, for example, in a range from 6 V to 13 V in increments of 0.1 V. Control unit 10 may obtain an appropriate bias voltage Vb by using an algorithm such as bisection method or a Newton method.

The relationship between the voltage and the phase change amount and the relationship between the voltage and the absorption loss change amount may change depending on the wavelength of light. The wavelength-tunable laser element 22 outputs light having a plurality of wavelengths, which is assumed to be used during the operation of optical modulator 40a. Control unit 10 performs the testing of FIG. 9 for each of a plurality of wavelengths. Storage device 34 stores a bias voltage for each of a plurality of wavelengths. Control unit 10 may perform the testing at, for example, the shortest wavelength and the longest wavelength in the wavelength range to obtain the bias voltage. Control unit 10 may perform the testing at, for example, three or more wavelengths in the wavelength range to acquire the bias voltage. By performing interpolation by linear interpolation, polynomial interpolation, spline interpolation, or the like, a bias voltage for a wavelength at which the testing is not performed can also be acquired.

In the first embodiment, there is a variation in phase adjusting efficiency between sub Mach-Zehnder modulators 42a and 42b in one optical modulator 40a, and an optimum voltage is acquired for each of sub Mach-Zehnder modulators 42a and 42b. The phase adjusting efficiency may vary for each optical modulator 40a. Control unit 10 performs the testing on a plurality of optical modulators 40a to obtain an optimum voltage for each optical modulator 40a. In the steps of FIGS. 8 and 9, light transmission apparatus 100 of FIG. 1A is utilized as a testing apparatus for optical modulator 40. One optical modulator 40a is built in light transmission apparatus 100 for testing. Then, optical modulator 40a is replaced by another one and the testing is performed. Storage device 34 may store voltages for a plurality of optical modulators 40a. When light transmission apparatus 100 is used for communication, one optical modulator 40a included in light transmission apparatus 100 may be tested. Storage device 34 may store only the voltage for the one optical modulator 40a.

Second Embodiment

In the second embodiment, a dual polarization (DP)-IQ optical modulator is used as optical modulator 40. The configuration of light transmission apparatus 100 is the same as that of the first embodiment.

Figure 17:
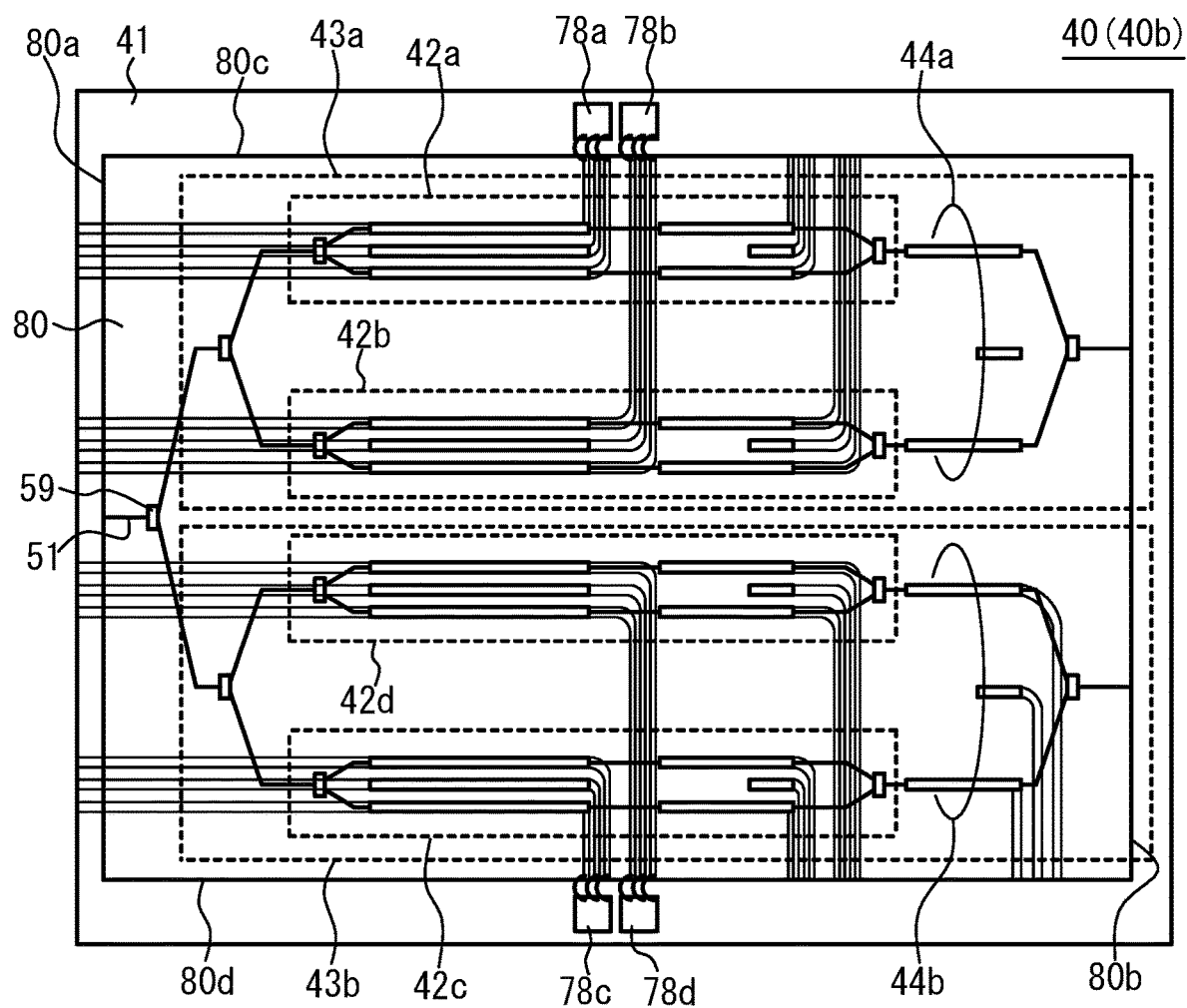
FIG. 17 is a plan view illustrating optical modulator.

FIG. 17 is a plan view illustrating optical modulator 40b. Optical modulator 40b is a DP-IQ optical modulator and has two optical modulators 43a and 43b.

Semiconductor substrate 80 and four termination elements 78a, 78b, 78c and 78d are mounted on the upper surface of substrate 41. Termination elements 78a, 78b, 78c, and 78d include, for example, resistors and capacitors. Termination elements 78a and 78b face end surface 80c of semiconductor substrate 80. Termination elements 78c and 78d face end surface 80d of semiconductor substrate 80. An input waveguide 51 and optical modulators 43a and 43b are formed on semiconductor substrate 80.

A first end portion of input waveguide 51 is located on end surface 80a of semiconductor substrate 80. A second end portion of input waveguide 51 is connected to a coupler 59. Two optical modulators 43a and 43b are arranged in parallel after coupler 59.

Optical modulator 43a is the IQ modulator and has two sub Mach-Zehnder modulators 42a and 42b and main Mach-Zehnder modulator 44a, as in optical modulator 40a of FIG. 2A. Optical modulator 43b is the IQ optical modulator and has two sub Mach-Zehnder modulators 42c and 42d and main Mach-Zehnder modulator 44b. The configurations of sub Mach-Zehnder modulator 42c and 42d are the same as those of sub Mach-Zehnder modulator 42a and 42b. The configuration of main Mach-Zehnder modulator 44b is the same as that of main Mach-Zehnder modulator 44a.

Optical modulator 43a generates modulated light of an X channel (X polarization). Optical modulator 43b generates modulated light of a Y channel (Y polarization). The polarization plane of the X-polarized wave is orthogonal to the polarization plane of the Y-polarized wave. Two modulated lights are multiplexed so that the planes of polarization are orthogonal to each other by using a polarization rotation element and a multiplexing element (not illustrated).

The manufacturing method of optical modulator 40b is similar to that of FIG. 8. Control unit 10 performs the testing of FIG. 9 for each of the Mach-Zehnder optical modulators in optical modulator 40b. When testing sub Mach-Zehnder modulators 42a and 42b and main Mach-Zehnder modulator 44a of optical modulator 43a, the operating points of sub Mach-Zehnder modulators 42c and 42d of optical modulator 43b are adjusted to the extinction points. When testing sub Mach-Zehnder modulators 42c and 42d and main Mach-Zehnder modulator 44b of optical modulator 43b, the operating points of sub Mach-Zehnder modulators 42a and 42b of optical modulator 43a are adjusted to the extinction points.

Table 2 is an example of a data table stored in storage device 34. Storage device 34 stores the voltages of optical modulator 40b.

TABLE 2

|  | Vb [V] |
|---|---|
| Xch, Ich | 8.9 |
| Xch, Qch | 9.5 |
| Ych, Ich | 9.4 |
| Ych, Qch | 9.5 |

Xch represents optical modulator 43a. Among Xch, Ich represents sub Mach-Zehnder modulator 42a, and Qch represents sub Mach-Zehnder modulator 42b. Ych represents optical modulator 43b. Among Ych, Ich represents sub Mach-Zehnder modulator 42c, and Qch represents sub Mach-Zehnder modulator 42d. The bias voltage of sub Mach-Zehnder modulator 42a is, for example, 8.9 V. The bias voltage of sub Mach-Zehnder modulator 42b is, for example, 9.5 V. The bias voltage of sub Mach-Zehnder modulator 42c is, for example, 9.4 V. The bias voltage of sub Mach-Zehnder modulator 42d is, for example, 9.5 V.

According to the second embodiment, by driving the Mach-Zehnder optical modulator with the voltages each optimized for each Mach-Zehnder optical modulator, it is possible to set the phase change amount at the time of modulation to a predetermined magnitude and to suppress the increase in light absorption loss.

An example of optical modulator 40 is the IQ optical modulator in the first embodiment and the DP-IQ optical modulator in the second embodiment. The present disclosure may be applied to other optical modulators.

Although the embodiments of the present disclosure have been described in detail above, the present disclosure is not limited to the specific embodiments, and various modifications and changes can be made within the scope of the gist of the present disclosure described in the claims.

What is claimed is:

1. A method for manufacturing an optical modulator, the optical modulator including a Mach-Zehnder modulator, the Mach-Zehnder modulator including an electrode and an arm waveguide, the electrode being disposed on the arm waveguide, the method comprising:
   a step of preparing the Mach-Zehnder modulator;
   a step of calculating a light transmittance in the arm waveguide based on a change amount of absorption loss of light propagating through the arm waveguide, an initial phase shift, and a phase change amount of the light propagating through the arm waveguide;
   a step of acquiring, based on the light transmittance in the arm waveguide, a relationship between a voltage applied to the electrode and the phase change amount of the light propagating through the arm waveguide;
   a step of acquiring, based on the relationship, a voltage in which the phase change amount of the light propagating through the arm waveguide has a predetermined amount when the light is modulated; and
   a step of storing the voltage acquired in the step of acquiring in a storage unit.

2. The method for manufacturing an optical modulator according to claim 1, wherein
   the step of preparing the Mach-Zehnder modulator is a step of preparing a plurality of the Mach-Zehnder modulators, and
   the step of acquiring the relationship between the voltage and the phase change amount and the step of acquiring the voltage are performed on each of the plurality of Mach-Zehnder modulators.

3. The method for manufacturing an optical modulator according to claim 1, wherein
   the step of preparing the Mach-Zehnder modulator includes a step of preparing the Mach-Zehnder modulator including a first arm waveguide, a second arm waveguide, a first electrode, and a second electrode,
   the first electrode is disposed on the first arm waveguide,
   the second electrode is disposed on the second arm waveguide, and
   the step of acquiring the voltage includes
      a step of acquiring a voltage that is applied to the first electrode and in which a phase change amount of light propagating through the first arm waveguide has a predetermined amount, and
      a step of acquiring a voltage that is applied to the second electrode and in which a phase change amount of light propagating through the second arm waveguide has a predetermined amount.

4. The method for manufacturing an optical modulator according to claim 3, wherein
   the voltage applied to the first electrode is a sum of a first voltage and a second voltage,
   the voltage applied to the second electrode is a difference between the first voltage and the second voltage, and
   the step of acquiring the voltage includes a step of acquiring the first voltage in which the second voltage has a predetermined value or less.

5. The method for manufacturing an optical modulator according to claim 4, wherein
the step of preparing the Mach-Zehnder modulator includes a step of preparing the Mach-Zehnder modulator including the first arm waveguide, the second arm waveguide, the first electrode, the second electrode, a third electrode, and a fourth electrode,
the third electrode is disposed on the first arm waveguide,
the fourth electrode is disposed on the second arm waveguide, and
the step of acquiring the relationship between the voltage and the phase change amount includes
a step of acquiring a relationship between the voltage applied to the first electrode and the phase change amount of the light propagating through the first arm waveguide, based on a relationship between a voltage applied to the third electrode and the phase change amount of the light propagating through the first arm waveguide, and
a step of acquiring a relationship between the voltage applied to the second electrode and the phase change amount of the light propagating through the second arm waveguide, based on a relationship between a voltage applied to the fourth electrode and the phase change amount of the light propagating through the second arm waveguide.

6. The method for manufacturing an optical modulator according to claim 5, further comprising:
a step of measuring a first transmittance which is a light transmittance in the arm waveguide; and
a step of calculating a second transmittance which is a light transmittance in the arm waveguide, wherein
in the step of calculating the second transmittance,
a second transmittance in the first arm waveguide is represented by a function of the phase change amount of the light propagating through the first arm waveguide, the phase change amount of the light propagating through the first arm waveguide is represented by a function of the voltage applied to the third electrode, and thus the second transmittance in the first arm waveguide is calculated, and
a second transmittance in the second arm waveguide is represented by a function of the phase change amount of the light propagating through the second arm waveguide, the phase change amount of the light propagating through the second arm waveguide is represented by a function of the voltage applied to the fourth electrode, and thus the second transmittance in the second arm waveguide is calculated, and
the step of acquiring the relationship between the voltage and the phase change amount includes
a step of acquiring a relationship between the voltage applied to the third electrode and the phase change amount of the light propagating through the first arm waveguide by adjusting the second transmittance in the first arm waveguide such that the second transmittance in the first arm waveguide approaches a first transmittance in the first arm waveguide, and
a step of acquiring a relationship between the voltage applied to the fourth electrode and the phase change amount of the light propagating through the second arm waveguide by adjusting the second transmittance in the second arm waveguide such that the second transmittance in the second arm waveguide approaches a first transmittance in the second arm waveguide.

7. The method for manufacturing an optical modulator according to claim 1, wherein
the step of preparing the Mach-Zehnder modulator includes a step of forming the Mach-Zehnder modulator,
the step of forming the Mach-Zehnder modulator includes a step of forming the arm waveguide including a first semiconductor layer, a core layer, and a second semiconductor layer,
the first semiconductor layer, the core layer, and the second semiconductor layer are stacked in order,
the first semiconductor layer has a first conductivity type, and
the second semiconductor layer has a second conductivity type.

8. The method for manufacturing an optical modulator according to claim 1, wherein
the step of calculating the light transmittance in the arm waveguide further includes
a step of measuring a first light transmittance in the arm waveguide while sweeping voltage applied from a circuit to the electrode;
a step of calculating a second light transmittance in the arm waveguide; and
a step of optimizing a transmittance based on the first light transmittance and the second light transmittance.

9. A method for testing an optical modulator,
the optical modulator including a Mach-Zehnder modulator,
the Mach-Zehnder modulator including an electrode and an arm waveguide,
the electrode being disposed on the arm waveguide,
the method comprising:
a step of calculating a light transmittance in the arm waveguide based on a change amount of absorption loss of light propagating through the arm waveguide, an initial phase shift, and a phase change amount of the light propagating through the arm waveguide;
a step of acquiring, based on the light transmittance in the arm waveguide, a relationship between a voltage applied to the electrode and a phase change amount of the light propagating through the arm waveguide; and
a step of acquiring, based on the relationship, a voltage in which the phase change amount of the light propagating through the arm waveguide has a predetermined amount when the light is modulated.

10. A non-transitory storage medium storing a program for testing an optical modulator,
the optical modulator including a Mach-Zehnder modulator,
the Mach-Zehnder modulator including an electrode and an arm waveguide,
the electrode being disposed on the arm waveguide,
the program causing a computer to execute:
a process of calculating a light transmittance in the arm waveguide based on a change amount of absorption loss of light propagating through the arm waveguide, an initial phase shift, and a phase change amount of the light propagating through the arm waveguide;
a process of acquiring, based on a light transmittance in the arm waveguide, a relationship between a voltage applied to the electrode and a phase change amount of light propagating through the arm waveguide; and
a process of acquiring, based on the relationship, a voltage in which the phase change amount of the light propagating through the arm waveguide has a predetermined amount when the light is modulated.

* * * * *